(12) United States Patent  
Tani

(10) Patent No.: US 8,161,300 B2
(45) Date of Patent: Apr. 17, 2012

(54) INSTRUCTING DEVICE CONFIGURED TO SELECTS A COOPERATING DEVICE BASED ON A PREDETERMINED POWER SUPPLY RELIABILITY

(75) Inventor: Takenobu Tani, Kyoto (JP)

(73) Assignee: Panasonic Corporation, Osaka (JP)

( * ) Notice: Subject to any disclaimer, the term of this patent is extended or adjusted under 35 U.S.C. 154(b) by 590 days.

(21) Appl. No.: 12/307,955

(22) PCT Filed: Jul. 5, 2007

(86) PCT No.: PCT/JP2007/063476
§ 371 (c)(1),
(2), (4) Date: Jan. 8, 2009

(87) PCT Pub. No.: WO2008/007609
PCT Pub. Date: Jan. 17, 2008

(65) Prior Publication Data
US 2009/0313486 A1    Dec. 17, 2009

(30) Foreign Application Priority Data

Jul. 11, 2006    (JP) ................................. 2006-189982

(51) Int. Cl.
*G06F 1/00*    (2006.01)
(52) U.S. Cl. .......................... 713/300; 713/323; 713/340
(58) Field of Classification Search .................. 713/300, 713/323, 340
See application file for complete search history.

(56) References Cited

U.S. PATENT DOCUMENTS 6,108,316 A * 8/2000 Agrawal et al. .............. 370/311
7,855,798 B2 * 12/2010 Toyoda ....................... 358/1.15
2001/0052995 A1 * 12/2001 Idehara ....................... 358/1.15
2002/0144162 A1 * 10/2002 Tada et al. .................... 713/300
2002/0194417 A1 * 12/2002 Suzuki et al. ................. 710/305
2003/0163652 A1    8/2003 Tsuge (Continued)

FOREIGN PATENT DOCUMENTS

JP    11-346215    12/1999

(Continued)

OTHER PUBLICATIONS

International Search Report issued Oct. 16, 2007 in the International (PCT) Application of which the present application is the U.S. National Stage.

*Primary Examiner* — Vincent Tran
(74) *Attorney, Agent, or Firm* — Wenderoth, Lind & Ponack, L.L.P.

(57) ABSTRACT

A table information reception unit in an instructing device receives, from processing devices connected to a network, device names of the processing devices, function information indicating functions included in the processing devices, and power information indicating a reliability of power supply to the processing devices, and causes such information to be reflected in a table stored in a storage unit. Upon receiving a processing request from a user, an analysis unit analyzes the content thereof, transmits, to an execution control unit, requested function information indicating functions necessary to execute processing corresponding to the processing request. Based on the requested function information, the execution control unit judges whether cooperation with another processing device is necessary, and if necessary, selects, based on the table stored in the storage unit, a processing device expected to have a stable power supply to be a cooperating processing device.

12 Claims, 26 Drawing Sheets

U.S. PATENT DOCUMENTS

2005/0267797 A1* 12/2005 Takahashi et al. ............ 705/11
2006/0274370 A1* 12/2006 Shima ........................ 358/1.15

FOREIGN PATENT DOCUMENTS

| | | |
|---|---|---|
| JP | 2000-148312 | 5/2000 |
| JP | 2000-322228 | 11/2000 |
| JP | 2002-14748 | 1/2002 |
| JP | 2002-318674 | 10/2002 |
| JP | 2003-16044 | 1/2003 |
| JP | 2003-248611 | 9/2003 |
| JP | 2003-335026 | 11/2003 |
| JP | 2005-038339 | 2/2005 |
| JP | 2005-252402 | 9/2005 |
| WO | 2005/083574 | 9/2005 |

* cited by examiner

FIG. 4

| DEVICE NAME 401 | PROVIDED FUNCTION 402 | | | | |
|---|---|---|---|---|---|
| DEVICE A | MPEG2 decoder | MPEG2 encoder | Down convert | | |
| DEVICE B | H.264 tuner | MPEG2 tuner | H.264 encoder | MPEG2 encoder | |
| DEVICE C | H.264 tuner | H.264 decoder | AAC decoder | x20 AAC encoder | |
| DEVICE D | H.264 decoder | H.264 encoder | MPEG2/H.264 transcode | Audio virtual surround | |

FIG. 5

| DEVICE NAME (501) | UNPLUGGABILITY (502) | ESTIMATED UNPLUGGED PROBABILITY (503) |
|---|---|---|
| DEVICE A | YES | Low |
| DEVICE B | YES | Normal |
| DEVICE C | NO | — |
| DEVICE D | NO | — |
|  |  |  |

FIG. 6

| FUNCTION NAME | UNPLUGGABILITY CRITERIA | ESTIMATED PROBABILITY CRITERIA |
|---|---|---|
| MPEG2 decoder | YES | Normal |
| MPEG2 encoder | YES | High |
| Down convert | YES | Low |
| H.264 tuner | NO | — |
| | | |

FIG. 9

| FUNCTION NAME | BATTERY CRITERIA | MAXIMUM OPERATING TIME CRITERIA |
|---|---|---|
| MPEG2 decoder | YES | 2h |
| MPEG2 encoder | YES | 3h |
| Down convert | YES | 1h |
| H.264 tuner | NO | — |
| | | |

FIG. 11

| DEVICE NAME | CUT-OFF COUNT |
|---|---|
| DEVICE A | 174 |
| DEVICE B | 170 |
| DEVICE C | 0 |
| DEVICE D | 3 |
| | |

FIG. 14

| DEVICE NAME | AC POWER SUPPLY CUT-OFF COUNT | MAIN POWER SUPPLY CUT-OFF COUNT |
|---|---|---|
| DEVICE A | 0 | 174 |
| DEVICE B | 160 | 10 |
| DEVICE C | 0 | 0 |
| DEVICE C | 1 | 2 |
| | | |

FIG. 16

| DEVICE NAME ~501 | AC POWER SUPPLY CUT-OFF COUNT ~1401 | MAIN POWER SUPPLY CUT-OFF TIME ~1601 | ~1600 |
|---|---|---|---|
| DEVICE A | 0 | 1000h | |
| DEVICE B | 160 | 80h | |
| DEVICE C | 0 | 0h | |
| DEVICE D | 1 | 12h | |
| | | | |

FIG. 18

| DEVICE NAME | MID-EXECUTION CUT-OFF COUNT |
|---|---|
| DEVICE A | 0 |
| DEVICE B | 7 |
| DEVICE C | 0 |
| DEVICE D | 2 |
| | |

FIG. 20

| DATE | OPERATION TIME LENGTH | TIME PERIOD OPERATION HISTORY | | | | | |
|---|---|---|---|---|---|---|---|
| | | 0~1 | 1~2 | ... | 11~12 | 12~13 | ... |
| 2007/5/1 | 3:57 | 1 | | | | | |
| 2007/5/2 | 2:13 | | | | 1 | 1 | |
| 2007/5/3 | 0:00 | | | | | | |
| 2007/5/4 | 4:03 | 1 | | | 1 | 1 | |
| 2007/5/5 | 1:28 | | | | 1 | | |
| 2007/5/6 | 2:40 | | | | 1 | 1 | |
| 2007/5/7 | 1:10 | | | | 1 | 1 | |

FIG. 21

| DEVICE NAME | AVERAGE OPERATION TIME | MOST-OPERATIONAL TIME PERIOD |
|---|---|---|
| DEVICE A | 2:13 | 11:00〜13:00 |
| DEVICE B | 1:18 | 21:00〜22:00 |
| DEVICE C | 2:03 | — |
| DEVICE D | 7:24 | 10:00〜17:00 |
|  |  |  |

INSTRUCTING DEVICE CONFIGURED TO SELECTS A COOPERATING DEVICE BASED ON A PREDETERMINED POWER SUPPLY RELIABILITY

TECHNICAL FIELD

The present invention relates to technology for cooperative processing among a plurality of devices connected to a network.

BACKGROUND ART

In recent years, cooperative processing has been performed between general consumer electrical devices such as TV receivers and DVD/HDD (Hard Disk Drive) recorders that can be connected to a network. For example, a user can instruct a DVD/HDD recorder to perform scheduled recording by using a remote control or the like to perform an operation on a TV receiver displaying a TV program listing.

Technology for cooperative processing among devices is disclosed in, for example, patent documents 1 and 2. The following briefly describes the technology disclosed in these documents.

Patent document 1 discloses a content recording system in which a plurality of video recording devices are connected to a network. In this content recording system, if a plurality of videos provided at the same time are to be recorded by one of the video recording devices, and recording all of the videos would exceed the recording capability of the video recording device, the non-operating resource of another video recording device is utilized in performing the video recording.

Also, patent document 2 discloses a programmable controller network system in which a user presets candidate alternative stations for a management station and a priority order for the alternative stations. If the management station stops operating, the alternative station having the highest priority among the candidate alternative stations set by the user is selected as the alternative station.

Patent document 1: Japanese Patent Application Publication No. 2005-25-2402
Patent document 2: Japanese Patent Application Publication No. H11-346215

SUMMARY OF THE INVENTION

Problems Solved by the Invention

However, the technology of patent document 1 assumes that power is reliably supplied to the video recording devices. With general consumer electrical devices such as TV receivers and DVD/HDD recorders installed in a household etc., there is a possibility that a user will cut off the power supply at an arbitrary timing by turning off the so-called main power switch provided on the device, unplugging the power cable, or turning off the power switch of a power strip.

Since patent document 1 does not take into account such cases in which the power supply is cut off, cooperative processing will not be completed if the power supply to one of the devices executing cooperative processing is cut off.

According to patent document 2, if the power supply to a device executing cooperative processing is cut off, cooperative processing may be continued by switching to an alternative device. However, it is impossible to avoid an interruption in the cooperative processing when switching to the alternative device. Such an interruption in cooperative processing is problematic in a case of processing that requires are high degree of real-time capability, such as processing for recording a TV program transmitted from a broadcast station (cooperative processing performed by the device receiving the TV program and the device recording the video).

The present invention has been achieved in view of the above problems, and an aim thereof is to provide an information processing system that lowers the possibility of an interruption in cooperation processing among a plurality of devices.

Means to Solve the Problems

In order to solve the above problem, one aspect of the present invention is an information processing system including an instructing device that instructs execution of predetermined processing and a plurality of processing devices that are able to execute the predetermined processing, the instructing device including: a power information reception unit operable to receive a plurality of power information pieces that are in one-to-one correspondence with the plurality of processing devices, each power information piece relating to power supply of the corresponding processing device and being stored by the corresponding processing device; a selection unit operable to select, from among the processing devices, a processing device to be instructed to execute the predetermined processing, in accordance with the power information pieces received by the power information reception unit; and an instruction transmission unit operable to transmit an instruction to execute the predetermined processing to the processing device selected by the selection unit, and each processing device including: an instruction reception unit operable to receive the instruction to execute the predetermined processing transmitted by the instructing device; an execution unit operable to execute the predetermined processing if the instruction reception unit has received the instruction to execute the predetermined processing; and a power information transmission unit operable to transmit the power information piece that relates to power supply to the own processing device.

According to this structure, the selection unit of the instructing device selects the processing device that is to be requested to execute the predetermined processing, based on power information relating to the power supply to the processing devices. Therefore, in a case where the power information is information indicating the reliability of power supply, such as information indicating whether the power cable of the processing devices can be unplugged from the plug socket (the power outlet), selecting the processing device that has a high power supply reliability enables lowering the possibility that the execution of the predetermined processing will be interrupted due to the power supply to the processing device being cut off.

Effects of the Invention

Also, the power information transmission unit of each processing device may include: a storage subunit storing therein the power information piece relating to the own processing device; a detection subunit operable to detect a change in a state of power supply to the own processing device; and an update subunit operable to, each time the detection subunit detects a change in the state of power supply, update the power information piece stored in the storage subunit so that a result of the detection is reflected in said power information piece, and if the update unit has updated the power information piece, the power information transmission unit may transmit the updated power information piece.

According to this structure, each time a change in the power supply state is detected by the detection subunit, the update subunit of the power information transmission unit performs an update to cause the detection result to be reflected in the power information, and if the power information has been updated by the update subunit, the power information transmission unit transmits the updated power information. This structure enables selecting a processing device based on power information that reflects the detection result pertaining to the most recent detection result in the processing devices.

Also, each time a change in the power supply state is detected by the detection subunit, the update subunit of the power information transmission unit performs an update to cause the detection result to be reflected in the power information, thereby enabling the instructing device to select a processing device without burdening the users of the processing devices with setting the power information in advance.

Also, each power information piece may include a cut-off count indicating the number of times that power supply to the own processing device has been cut off, the detection subunit of the power information transmission unit may detect a start of power supply to the own processing device, the update subunit of the power information transmission unit may increment the cut-off count by one each time the detection subunit performs the detection, and the selection unit of the instructing device may select the processing device to be instructed to execute the predetermined processing, in accordance with the cut-off counts received by the power information reception unit of the instructing device.

According to this structure, each time the detection subunit of the power information transmission unit detects the beginning of the power supply to the own device, the update subunit of the power information transmission unit increments the cut-off count in the power information by one. Therefore, if the selection unit of the instructing device selects the processing device that, for example, has the lowest cut-off count or a cut-off count that is less than a predetermined reference count, it is possible to lower the possibility that the execution of the predetermined processing will be interrupted due to the power supply to the processing device being cut off.

Also, each processing device may further include a main power supply control unit operable to (i) switch between a supply state of supplying power from an alternating current power supply to the execution unit and a cut-off state of cutting off power from the alternating current power supply to the execution unit, and (ii) identify one of the supply state and the cut-off state, each power information piece may include an alternating current power supply cut-off count indicating the number of times that power supply from the alternating current power supply to the own processing device has been cut off, the detection subunit of the power information transmission unit may detect a start of power supply from the alternating current power supply to the own processing device, the update subunit of the power information transmission unit may increment the alternating current power supply cut-off count by one each time the detection subunit performs the detection while the main power supply control unit is identifying the supply state, and the selection unit of the instructing device may select the processing device to be instructed to execute the predetermined processing, in accordance with the alternating current power supply cut-off counts received by the power information reception unit of the instructing device.

According to this structure, the update subunit of the power information transmission unit increments the alternating current cut-off count by one each time the detection subunit performs the detection when the main power supply control unit enters the supply state. Therefore, the alternating current cut-off count indicates the number of times that power supply from the alternating current power supply has been cut off while power was being supplied to the execution unit of the processing device, that is to say, the number of times that the power supply to the execution unit has been cut off due to, for example, the power cable being unplugged from the power outlet. Accordingly, if the selection unit of the instructing device selects the processing device that, for example, has the lowest alternating current cut-off count or an alternating current cut-off count that is less than a predetermined reference count, it is possible to lower the possibility that the execution of the predetermined processing will be interrupted due to the power supply to the processing device being cut off.

Also, the main power supply control unit may be further operable to measure a time during which the cut-off state is being identified, each power information piece may further include a main power supply cut-off time indicating the time during which the main power supply control is identifying the cut-off state, each time the main power supply control unit switches from the cut-off state to the supply state while the detection subunit has not performed the detection, the update subunit of the power information transmission unit may add, to the main power supply cut-off time, the time measured by the main power supply control unit, and the selection unit of the instructing device may select the processing device to be instructed to execute the predetermined processing, furthermore in accordance with the main power supply cut-off times received by the power information reception unit of the instructing device.

According to this structure, each time the main power supply control unit of the processing device switches from the cut-off state, in which the detection subunit has not performed the detection, to the supply state, the update subunit of the power information transmission unit adds, to the main power supply cut-off time in the power information, the time measured by the main power supply control unit. Therefore, the main power supply cut-off time indicates the time for which the power supply to the execution unit has been cut off due to the main power supply control unit switching to the cut-off state while the power supply is being supplied from the alternating current power supply. Accordingly, if the selection unit of the instructing device selects the processing device that, for example, has the lowest alternating current cut-off count or an alternating current cut-off count that is less than a predetermined reference count, and has the longest main power supply cut-off time or a main power supply cut-off time that is longer than a predetermined reference time, it is possible to lower the possibility that the execution of the predetermined processing will be interrupted due to the power supply to the processing device being cut off.

Also, each processing device may further include a main power supply control unit operable to (i) switch between a supply state of supplying power from an alternating current power supply to the execution unit and a cut-off state of cutting off power from the alternating current power supply to the execution unit, and (ii) identify one of the supply state and the cut-off state, each power information piece may include a main power supply cut-off count indicating the number of times that power supply has been cut off by the switching performed by the main power supply control unit, the detection subunit of the power information transmission unit may detect a start of power supply from the alternating current power supply to the own processing device, each time the main power supply control unit switches from the cut-off state to the supply state while the detection subunit has not performed the detection, the update subunit of the power information transmission unit may increment the main power supply cut-off count by one, and the selection unit of the instructing device may select the processing device to be instructed to execute the predetermined processing, in accordance with the main power supply cut-off counts received by the power information reception unit of the instructing device.

According to this structure, each time the main power supply control unit of the processing device switches from the cut-off state, in which the detection subunit of the power information transmission unit has not performed the detection, to the supply state, the update subunit of the power information transmission unit increments the main power supply cut-off count in the power information by one. Therefore, the main power supply cut-off count indicates the number of times that the power supply to the execution unit has been cut off due to the main power supply control unit switching to the cut-off state while the power supply is being supplied from the alternating current power supply. Accordingly, if the selection unit of the instructing device selects the processing device that, for example, has the lowest main power supply current cut-off count or a main power supply cut-off count that is less than a predetermined reference count, it is possible to lower the possibility that the execution of the predetermined processing will be interrupted due to the power supply to the processing device being cut off.

Also, the execution unit of each processing device may be further operable to identify whether the predetermined processing is being executed, each power information piece may include a mid-execution cut-off count indicating the number of times that power supply to the own processing device has been cut off while the execution unit is executing the predetermined processing, the detection subunit of the power information transmission unit may detect a start of power supply to the own processing device, the update subunit of the power information transmission unit may increment the mid-execution cut-off count by one each time the detection subunit performs the detection while the execution unit is executing the predetermined processing, and the selection unit of the instructing device may select the processing device to be instructed to execute the predetermined processing, in accordance with the mid-execution cut-off counts received by the power information reception unit of the instructing device.

According to this structure, the update subunit of the power information transmission unit increments the mid-execution cut-off count by one each time the detection subunit of the power information transmission unit performs the detection while the execution unit of the processing device is executing the predetermined processing. Therefore, if the selection unit of the instructing device selects the processing device that, for example, has the lowest mid-execution cut-off count or a mid-execution cut-off count that is less than a predetermined reference count, it is possible to lower the possibility that the execution of the predetermined processing will be interrupted due to the power supply to the processing device being cut off.

Also, each processing device may further include a clock unit operable to measure a time during which the own processing device is operating and store therein the measured time, each power information piece may include an average operation time of the own processing device with respect to a predetermined duration, the detection subunit of the power information transmission unit may detect a start of power supply to the own processing device, each time the detection subunit performs the detection, the update subunit of the power information transmission unit may update the average operation time so that the time stored by the clock unit is reflected in the average operation time, and the selection unit of the instructing device may select the processing device to be instructed to execute the predetermined processing, in accordance with the average operation times received by the power information reception unit of the instructing device.

According to this structure, each time the detection subunit of the power information transmission unit performs the detection, the update subunit of the power information transmission unit updates the average operation time so that the operating time stored by the clock unit of the processing device, that is to say the operating time of the previous case of operation, is reflected in the average operation time in the power information. Therefore, if the selection unit of the instructing device selects the processing device that, for example, has the longest average operation time or an average operation time that is longer than a predetermined reference time, it is possible to lower the possibility that the execution of the predetermined processing will be interrupted due to the power supply to the processing device being cut off.

Also, each processing device may further include a clock unit operable to measure an operating time of the own processing device in each of predetermined time periods and store therein the measured operating times, each power information piece may include an operation history of the own processing device pertaining to the predetermined time periods, the detection subunit of the power information transmission unit may detect a start of power supply to the own processing device, each time the detection subunit performs the detection, the update subunit of the power information transmission unit may update the operation history so that the operating times of the own processing device in the predetermined time periods stored by the clock unit are reflected in the operation history, and the selection unit of the instructing device may select the processing device to be instructed to execute the predetermined processing, in accordance with the operation histories received by the power information reception unit of the instructing device.

According to this structure, each time the detection subunit of the power information transmission unit performs the detection, the update subunit of the power information transmission unit updates the operation history so that the operating times in the predetermined time periods stored by the clock unit are reflected in the operation history (e.g., operation counts for each time period) in the power information. Therefore, if the selection unit of the instructing device selects the processing device that, for example, has the highest operation count in the time period in which the predetermined processing is to be executed or an operation count in such time period that is higher than a predetermined reference count, it is possible to lower the possibility that the execution of the predetermined processing will be interrupted due to the power supply to the processing device being cut off.

Also, the power information transmission unit of each processing device may include a storage subunit storing therein the power information piece relating to the own processing device, each power information piece may include a cut-ability information piece that is preset information for identifying whether a user can perform an operation to cut off power supply from an alternating current power supply to the own processing device, and the selection unit of the instructing device may select the processing device to be instructed to execute the predetermined processing, in accordance with the cut-ability information pieces received by the power information reception unit of the instructing device.

According to this structure, the power information transmission unit of the processing device transmits power information that includes cut-ability information that identifies whether a user can perform an operation to cut off the power supply from the alternating current power supply to the processing device. Therefore, if the selection unit of the instructing device selects, for example, a processing device whose cut-ability information indicates that such an operation cannot be performed, it is possible to lower the possibility that the execution of the predetermined processing will be interrupted due to the power supply to the processing device being cut off.

Also, the power information transmission unit of each processing device may include a storage subunit storing therein the power information piece relating to the own processing device, each power information piece may include an estimated value information piece that is preset information indicating an estimated value of a probability that a user has performed an operation to cut off power supply from an alternating current power supply to the own processing device, and the selection unit of the instructing device may select the processing device to be instructed to execute the predetermined processing, in accordance with the estimated value information pieces received by the power information reception unit of the instructing device.

According to this structure, the power information transmission unit of the processing device transmits power information that includes estimated value information that is a preset estimated value indicating a probability of a user cutting off the power supply from the alternating current power supply to the processing device. Therefore, if the selection unit of the instructing device selects, for example, a processing device whose estimate value information indicates a lowest estimated value or an estimated value that is less than a predetermined specified value, it is possible to lower the possibility that the execution of the predetermined processing will be interrupted due to the power supply to the processing device being cut off.

Also, the power information transmission unit of each processing device may include a storage subunit storing therein the power information piece relating to the own processing device, each power information piece may include a battery presence information piece that is preset information for identifying whether the own processing device includes an internal battery, and the selection unit of the instructing device may select the processing device to be instructed to execute the predetermined processing, in accordance with the battery presence information pieces received by the power information reception unit of the instructing device.

According to this structure, the power information transmission unit of the processing device transmits power information that includes battery presence information that is preset information for identifying whether an internal battery exists in the processing device. Therefore, if the selection unit of the instructing device selects, for example, a processing device whose battery present information indicates that an internal battery is not present, it is possible to lower the possibility that the execution of the predetermined processing will be interrupted due to exhaustion of the internal battery in the processing device.

Also, each processing device may further include an internal battery, the power information transmission unit of each processing device may include a storage subunit storing therein the power information piece relating to the own processing device, each power information piece may include a maximum operating time that is preset information indicating a maximum battery-based operating time of the own processing device, and the selection unit of the instructing device may select the processing device to be instructed to execute the predetermined processing, in accordance with the maximum operating times received by the power information reception unit of the instructing device.

According to this structure, the power information transmission unit of the processing device transmits power information that includes a maximum operating time that is preset information indicating a maximum time for which the processing device can operate on the internal battery. Therefore, if the selection unit of the instructing device selects, for example, a processing device whose maximum operating time is longest or longer than a predetermined reference time, it is possible to lower the possibility that the execution of the predetermined processing will be interrupted, since there is an increased possibility of the predetermined processing being continued on the power of the internal battery even if the power supply from the alternating current power supply has been cut off.

Also, the instructing device and the processing devices may be connected via a LAN, the instructing device may further include a request information transmission unit operable to broadcast, via the LAN, request information that requests transmission of the power information pieces, each processing device may further include a request information reception unit operable to receive the request information transmitted by the instructing device, and in each processing device, the power information transmission unit may transmit the power information piece pertaining to the own processing device if the request information reception unit has received the request information.

According to this structure, the power information transmission unit of the processing device transmits the power information if the request information reception unit has received the request information broadcasted via the LAN by the instructing unit. Therefore, the instructing device can acquire power information from a processing device newly connected to the LAN and loses the ability to acquire power information from a processing device that has been disconnected from the LAN. In other words, this structure enables the instructing device to select a processing device to be instructed to perform the predetermined processing, based on power information from processing devices that are actually connected to the LAN.

Also, each processing device may further include a storage unit storing therein information relating to a function included in the own processing device, the request information may include function information relating to a function necessary to execute the predetermined processing, and in each processing device, the power information transmission unit may transmit the power information piece pertaining to the own processing device if the information stored in the storage unit includes the function information included in the request information received by the request information reception unit.

According to this structure, the power information transmission unit of the processing device transmits the power information if the function information included in the request information received by the request information reception unit is included in the information pertaining to the functions included in the processing device. This structure enables the instructing device to select a processing device to be instructed to execute the predetermined processing, based on power information from processing devices that can execute the predetermined processing.

Also, the instructing device and the processing devices may be connected via a LAN, each processing device may further include a detection unit operable to detect a change in a state of power supply to the own processing device, and in each processing device, the power information transmission unit may broadcast the power information piece pertaining to the own processing device via the LAN if the detection unit has detected a change in the state of power supply.

According to this structure, the power information transmission unit of the processing device broadcasts the power information via the LAN each time the detection unit has detected a change in the power supply state, that is to say, each time the detection unit has detected that, for example, the power supply to the processing device has begun. This structure enables the instructing device to select a processing device to be instructed to perform the predetermined processing, based on power information from processing devices that are actually connected to the LAN.

Also, the information processing system may further include a power information server, the instructing device may further include a request information transmission unit operable to transmit, to the power information server, request information that requests transmission of the power information pieces, and the power information server may include a server power information reception unit operable to receive the power information pieces transmitted by the power information transmission units of the processing devices; a request information reception unit operable to receive the request information transmitted by the instructing device; and a server power information transmission unit operable to, if the request information reception unit has received the request information, transmit the power information pieces received by the server power information reception unit to the instructing device that transmitted the request information.

According to this structure, upon receiving the request information from the instructing device, the power information transmission unit of the power information server transmits, to the instructing device, the power information received from the processing devices by the power information reception unit of the power information server. This structure enables the instructing device to select a processing device to be instructed to perform the predetermined processing, based on power information managed by the power information server.

Another aspect of the present invention is an instructing device that instructs any of a plurality of external devices to execute predetermined processing, the instructing device including: a power information reception unit operable to receive a plurality of power information pieces that are in one-to-one correspondence with the plurality of external devices, each power information piece relating to power supply of the corresponding external device and being stored by the corresponding external device; a selection unit operable to select, from among the external devices, an external device to be instructed to execute the predetermined processing, in accordance with the power information pieces received by the power information reception unit; and an instruction transmission unit operable to transmit an instruction to execute the predetermined processing to the external device selected by the selection unit.

According to this structure, the selection unit of the instructing device selects the external device that is to be requested to execute the predetermined processing, based on power information relating to the power supply to the external devices. Therefore, in a case where the power information is information indicating the reliability of power supply, such as information indicating whether the power supply cable of the external devices can be unplugged from the plug socket (the power outlet), selecting the external device that has a high power supply reliability enables lowering the possibility that the execution of the predetermined processing will be interrupted due to the power supply to an external device being cut off.

Also, the instructing device may further include: a storage unit storing therein a criteria information table including (i) information indicating types of processing in correspondence with (ii) power information criteria information used when selecting the external device to be instructed to execute the corresponding type of processing, wherein the selection unit may acquire, from the criteria information table, power information criteria information that corresponds to the type of the predetermined processing, and selects the external device which holds the power information piece that satisfies the acquired power information criteria information.

According to this structure, the selection unit of the instructing device selects an external device that is holding power information that satisfies the power information criteria information, in the criteria information table, which corresponds to the type of the predetermined processing, thereby enabling the instructing device to select the external device that satisfies the criteria for the required power supply reliability corresponding to the type of the predetermined processing.

Specifically, the power information indicates the reliability of power supply by, for example, indicating whether the power cable of the external device can be unplugged from the power output, and the criteria information table includes criteria information indicating that the ability to be unplugged from the power outlet is not permitted in the case of processing during which an interruption must not occur (e.g., real-time processing such as the reception of a TV program). In this case, the above structure enables the selection unit of the instructing device to select an external device that has a high power supply reliability, that is to say satisfies the criteria information indicating that the ability to be unplugged from the power output is not permitted, as the external device to be instructed to execute the predetermined processing during which an interruption must not occur.

Also, the instructing device may further include: a reception unit operable to receive, from a user, power information criteria information used when selecting the external device to be instructed to execute the predetermined processing, wherein the selection unit may select the external device which holds the power information piece that satisfies the power information criteria information received by the reception unit.

According to this structure, the selection unit of the instructing device selects the external device that holds power information that satisfies the criteria information received from the user, thereby enabling the instructing device to select the external device that satisfies the criteria reflecting the user's intention.

For example, if the power information indicates the reliability of power supply, that is to say, whether the power cable of the external device can be unplugged from the power output, and the criteria information received from the user indicates, for example, that the ability to be unplugged from the power outlet is not permitted in the case of processing that is important to the user and during which an interruption must not occur, the selection unit of the instructing device can select an external device that has a high power supply reliability, that is to say satisfies the criteria information indicating that the ability to be unplugged from the power output is not permitted, as the external device to be instructed to execute the predetermined processing.

Another aspect of the present invention is a processing device that executes predetermined processing if an instruction to execute the predetermined processing has been received from an external device, the processing device including: a storage unit storing therein power information relating to the processing device; a detection unit operable to detect a change in a state of power supply to the processing device; an update unit operable to, each time the detection subunit detects a change in the state of power supply, update the power information stored in the storage unit so that a result of the detection is reflected in the power information; and a transmission unit operable to transmit the power information to the external device.

According to this structure, each time the detection unit of the processing device detects a change in the power supply state, the update unit of the processing device performs an update to cause the detection result to be reflected in the power information, and the transmission unit of the processing device transmits the updated power information. Therefore, in the exemplary case of the detection unit detecting that the power supply has been cut off and the power information indicating the number of times that the power supply has been cut off, if the external device transmits a processing execution instruction to a processing device whose number of times that the power supply has been cut off is lowest or less than a predetermined reference count, it is possible to lower the possibility that the execution of the predetermined processing will be interrupted due to the power supply to the processing device being cut off.

Another aspect of the present invention is an information processing method used in an information processing system including an instructing device that instructs execution of predetermined processing and a plurality of processing devices that are able to execute the predetermined processing, the information processing method including the following steps performed by the instructing device: receiving a plurality of power information pieces that are in one-to-one correspondence with the plurality of processing devices, each power information piece relating to power supply of the corresponding processing device and being stored by the corresponding processing device; selecting, from among the processing devices, a processing device to be instructed to execute the predetermined processing, in accordance with the power information pieces received in the power information reception step; and transmitting an instruction to execute the predetermined processing to the processing device selected in the selection step, and the information processing method including the following steps performed by each processing device: receiving the instruction to execute the predetermined processing transmitted by the instructing device; executing the predetermined processing if the instruction to execute the predetermined processing has been received in the instruction reception step; and transmitting the power information piece that relates to power supply to the own processing device.

Another aspect of the present invention is an information processing system including an instructing device that instructs execution of predetermined processing and a plurality of processing devices that are able to execute the predetermined processing, the instructing device including: a connection history information reception unit operable to receive a plurality of connection history information pieces that are in one-to-one correspondence with the plurality of processing devices, each connection history information piece relating to a network connection history of the corresponding processing device and being stored by the corresponding processing device; a selection unit operable to select, from among the processing devices, a processing device to be instructed to execute the predetermined processing, in accordance with the connection history information pieces received by the connection history information reception unit; and an instruction transmission unit operable to transmit an instruction to execute the predetermined processing to the processing device selected by the selection unit, and each processing device including: an instruction reception unit operable to receive the instruction to execute the predetermined processing transmitted by the instructing device; an execution unit operable to execute the predetermined processing if the instruction reception unit has received the instruction to execute the predetermined processing; and a connection history information transmission unit operable to transmit the connection history information piece that relates to the network connection history of the own processing device.

According to this structure, the selection unit of the instructing device selects the processing device that is to be requested to execute the predetermined processing, based on the connection history information relating to the network connection histories of the processing devices. Therefore, in a case of the connection history information being information indicating the network connection reliability, such as information indicating whether the network cable can be unplugged from the network cable port, selecting the processing device that has a high network connection reliability enables lowering the possibility that the execution of the predetermined processing will be interrupted due to the network connection to the processing device being cut off.

Another aspect of the present invention is an information processing method used in an information processing system including an instructing device that instructs execution of predetermined processing and a plurality of processing devices that are able to execute the predetermined processing, the information processing method including the following steps performed by the instructing device: receiving a plurality of connection history information pieces that are in one-to-one correspondence with the plurality of processing devices, each connection history information piece relating to a network connection history of the corresponding processing device and being stored by the corresponding processing device; selecting, from among the processing devices, a processing device to be instructed to execute the predetermined processing, in accordance with the connection history information pieces received in the connection history information reception step; and transmitting an instruction to execute the predetermined processing to the processing device selected in the selection step, and the information processing method including the following steps performed by each processing device: receiving the instruction to execute the predetermined processing transmitted by the instructing device; executing the predetermined processing if the instruction to execute the predetermined processing has been received in the instruction reception step; and transmitting the connection history information piece that relates to the network connection history of the own processing device.

Another aspect of the present invention is an information processing system including an instructing device that instructs execution of predetermined processing, a plurality of processing devices that are able to execute the predetermined processing, and a selection server that selects, from among the plurality of processing devices, a processing device to be instructed by the instructing device to execute the predetermined processing, the instructing device including: a request information transmission unit operable to transmit, to the selection server, request information that requests selection of the processing device to be instructed to execute the predetermined processing: a device information reception unit operable to receive, from the selection server, processing device information that identifies the processing device to be instructed to execute the predetermined processing; and an instruction transmission unit operable to transmit an instruction to execute the predetermined processing to the processing device indicated by the processing device information received by the device information reception unit, each processing device including: an instruction reception unit operable to receive the instruction to execute the predetermined processing transmitted by the instructing device; an execution unit operable to execute the predetermined processing if the instruction reception unit has received the instruction to execute the predetermined processing; and a power information transmission unit operable to transmit, to the selection server, the power information piece that relates to power supply to the own processing device, and the selection server including: a request information reception unit operable to receive the request information transmitted by the instructing device; a power information reception unit operable to receive the power information pieces transmitted by the processing devices; a selection unit operable to, if the request information reception unit has received the request information, select, from among the plurality of processing devices, the processing device to be instructed by the instructing device to execute the predetermined processing, in accordance with the power information pieces received by the power information reception unit; and a device information transmission unit operable to transmit, to the instructing device, the processing device information that identifies the processing device selected by the selection unit.

According to this structure, the selection unit of the selection server selects the processing device that is to be requested to execute the predetermined processing by the instructing device, based on power information relating to power supply received from the processing devices. Therefore, in a case where the power information is information indicating the reliability of power supply, such as information indicating whether the power supply cable of the processing devices can be unplugged from the plug socket, selecting the processing device that has a high power supply reliability enables lowering the possibility that the execution of the predetermined processing will be interrupted due to the power supply to the processing device being cut off.

Another aspect of the present invention is an information processing method used in an information processing system including an instructing device that instructs execution of predetermined processing, a plurality of processing devices that are able to execute the predetermined processing, and a selection server that selects, from among the plurality of processing devices, a processing device to be instructed by the instructing device to execute the predetermined processing, the information processing method including the following steps performed by the instructing device: transmitting, to the selection server, request information that requests selection of the processing device to be instructed to execute the predetermined processing; receiving, from the selection server, processing device information that identifies the processing device to be instructed to execute the predetermined processing; and transmitting an instruction to execute the predetermined processing to the processing device indicated by the processing device information received in the device information reception step, the information processing method including the following steps performed by each processing device: receiving the instruction to execute the predetermined processing transmitted by the instructing device; executing the predetermined processing if the instruction to execute the predetermined processing has been received in the instruction reception step; and transmitting, to the selection server, the power information piece that relates to power supply to the own processing device, and the information processing method including the following steps performed by the selection server: receiving the request information transmitted by the instructing device; receiving the power information pieces transmitted by the processing devices; if the request information has been received in the request information reception step, selecting, from among the plurality of processing devices, the processing device to be instructed by the instructing device to execute the predetermined processing, in accordance with the power information pieces received in the power information reception step; and transmitting, to the instructing device, the processing device information that identifies the processing device selected in the selection step.

BRIEF DESCRIPTION OF THE DRAWINGS

FIG. 4 shows a data structure and exemplary content of a provided function table 400;

FIG. 5 shows a data structure and exemplary content of a power supply attribute table 500;

FIG. 6 shows a data structure and exemplary content of a criteria information table 600;

FIG. 9 shows a data structure and exemplary content of a criteria information table 900;

FIG. 11 shows a data structure and exemplary content of a power supply attribute table 1100;

FIG. 14 shows a data structure and exemplary content of a power supply attribute table 1400;

FIG. 16 shows a data structure and exemplary content of a power supply attribute table 1600;

FIG. 18 shows a data structure and exemplary content of a power supply attribute table 1800;

FIG. 20 shows a data structure and exemplary content of operation history information 2000;

FIG. 21 shows a data structure and exemplary content of a power supply attribute table 2100;

Figure 1:
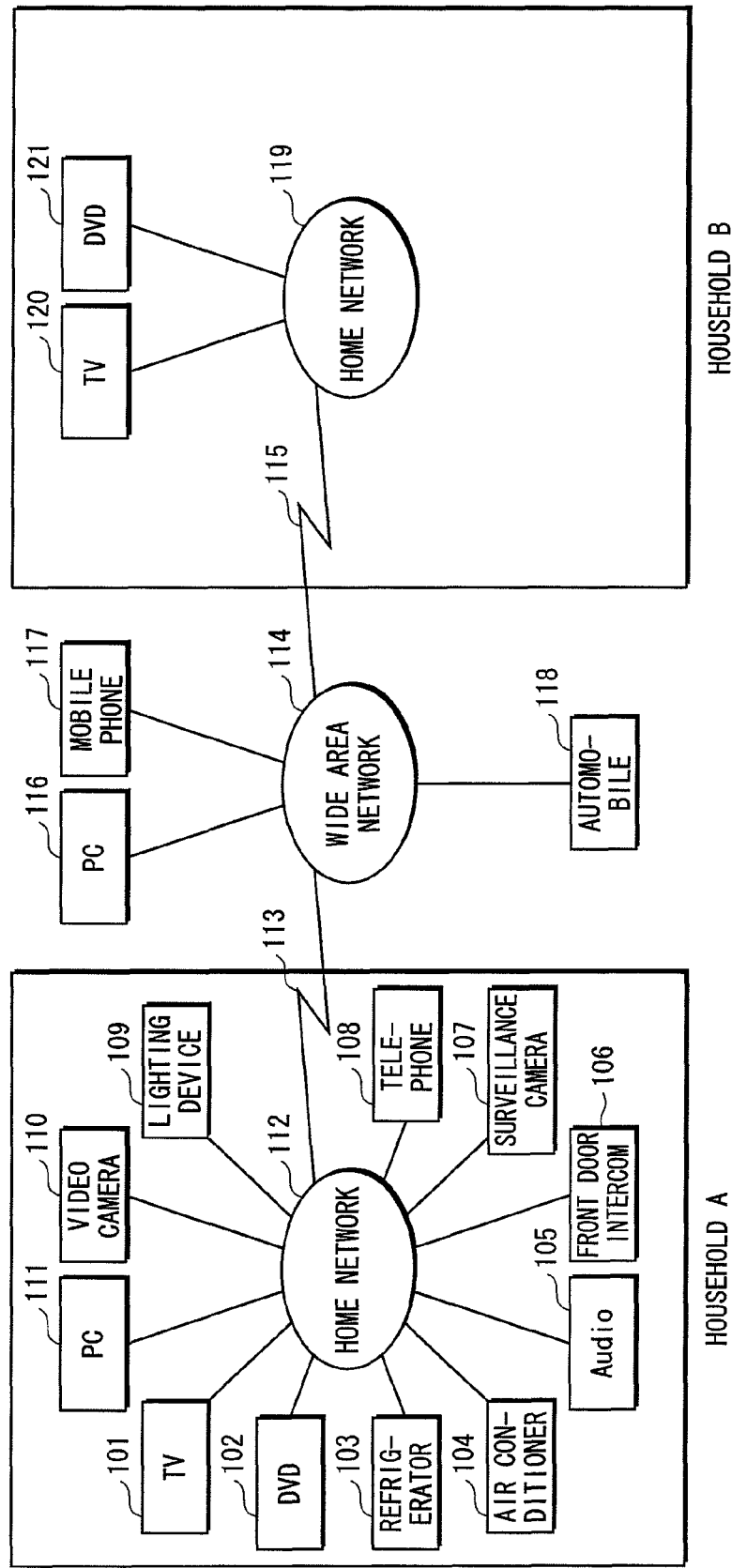
FIG. 1 shows a system structure of an information processing system 100 according to embodiment 1.

DESCRIPTION OF THE CHARACTERS 100, 2300 information processing system
112, 119 home network
113, 115 communication line
114 wide area network
200, 2400 instructing device
201, 2501 table information reception unit
202, 306, 2502 storage unit
203 human interface
204 analysis unit
205, 2401 execution control unit
206, 303, 1701 execution unit
207 instruction transmission unit
208, 301, 2506 network interface
210, 310, 2310 network
300, 1000, 1300, 1500, 1700, 1900 processing device
302 instruction reception unit
304, 1001, 1303, 1503, 1703, 1901 table information transmission unit
305, 1304, 1902 detection unit
307 transmission unit
320 AC power supply
1002, 1305, 1504, 1704, 1903 update unit
1301, 1501 main power control unit
1302, 1702 flag information
1502, 1904 clock unit
2402 request information transmission unit
2403 device information reception unit
2500 selection server
2503 request information reception unit
2504 selection unit
2505 device information transmission unit

DETAILED DESCRIPTION OF THE INVENTION

Embodiments of the present invention are described below with reference to the drawings.

Embodiment 1

Overview

An information processing system of embodiment 1 is an improvement on a conventional information processing system in which a plurality of devices connected to a network cooperatively process a processing request received from a user.

In the case of devices installed in general households etc., there is a possibility that users of the devices will turn off the main power switch of the devices, unplug the power cable, etc. at an arbitrary timing. If such an operation is performed during cooperative processing, the cooperative processing will stop.

In view of this, the information processing system of the present embodiment has a structure in which a device that has received a processing request from a user (hereinafter, called the "instructing device") selects, from among other devices (hereinafter, called "processing devices"), a processing device (hereinafter, called the "cooperating device") that is to be caused to perform processing in cooperation with the instructing device. In the present embodiment, the instructing device selects a processing device that satisfies a criteria for a predetermined power supply reliability.

The instructing device stores information indicating functions included in the processing devices (hereinafter, called the "provided function table"), information indicating the power supply reliability of the processing devices (hereinafter, called the "power supply attribute table"), and information indicating, for each function, a criteria for power supply reliability that must be satisfied by the processing device that is to execute the function (hereinafter, called the "criteria information table"). The instructing device selects a cooperating device based on these tables. Note that the data constituting the tables is collected from the processing devices by the instructing device.

Take the exemplary case in which a DVD/HDD recorder (the instructing device) receives, from a user, a processing request that is a request to record a TV program being broadcast in a format compliant with the H.264 standard (hereinafter, called the "H.264 format TV program"). If the DVD/HDD recorder lacks a tuner function for receiving the H.264 format TV program, the DVD/HDD recorder references the provided function table and selects all processing devices that have such a tuner function (e.g., digital TV receivers) as cooperating device candidates, then references the criteria information table and acquires the criteria for power supply reliability that must be satisfied by the processing device that is to execute the tuner function (e.g., a criteria such as not permitting the selection of a processing device whose power cable can be unplugged), and then references the power supply attribute table and selects, from among the cooperating device candidates, a processing device that satisfies the acquired criteria for power supply reliability as the cooperating device.

Since TV programs are generally broadcast in real-time, if the power supply to a processing device is cut off and the execution of the tuner function is interrupted, part of the TV program will not be received during the interruption. In other words, the execution of the tuner function must not be interrupted.

In view of this, the instructing device selects, as the cooperating device, a processing device that satisfies the criteria for power supply reliability corresponding to the function to be executed by the processing device (hereinafter, called the "cooperative function"). This enables causing a cooperative function during which an interruption must not occur to be executed by a cooperating device that can be expected to have a stable power supply, and lowers the possibility of an interruption in cooperative processing due to the power supply to the cooperating device that is executing cooperative processing being cut off.

Structure

Information Processing System Structure

First is a description of the structure of the information processing system of embodiment 1.

FIG. 1 shows a system structure of an information processing system 100 of embodiment 1.

As shown in FIG. 1, a home network 112 in a household A is connected to a wide area network 114 via a communication line 113, and the wide area network 114 is connected to a home network 119 in a household B via a communication line 115. The communication lines 113 and 115 respectively connect the home networks 112 and 119 to the wide area network 114 by a connection scheme such as a telephone line connection, an optical line connection, or a wireless connection.

The home network 112 is a LAN (Local Area Network) installed in the household A. Connected to the home network 112 are a TV receiver 101, a DVD/HDD recorder 102, a refrigerator 103, an air conditioner 104, an audio device 105, a front door intercom 106, a surveillance camera 107, a telephone 108, a lighting device 109, a video camera 110, and a personal computer 111, all of which are installed in the household A.

Connected to the wide area network 114 are a personal computer 116, a mobile phone 117, and an automobile 118.

The home network 119 is a LAN installed in the household B. Connected to the home network 119 are a TV receiver 120 and a DVD/HDD recorder 121, both of which are installed in the household B.

When any of the devices connected to the home network 112 or 119 or the wide area network 114 receive a processing request from a user, the device executes processing corresponding to the request in cooperation with another device if necessary. All of the connected devices can be either an instructing device or a processing device.

Instructing Device Structure

The following describes the functional structure of the instructing device.

Figure 2:
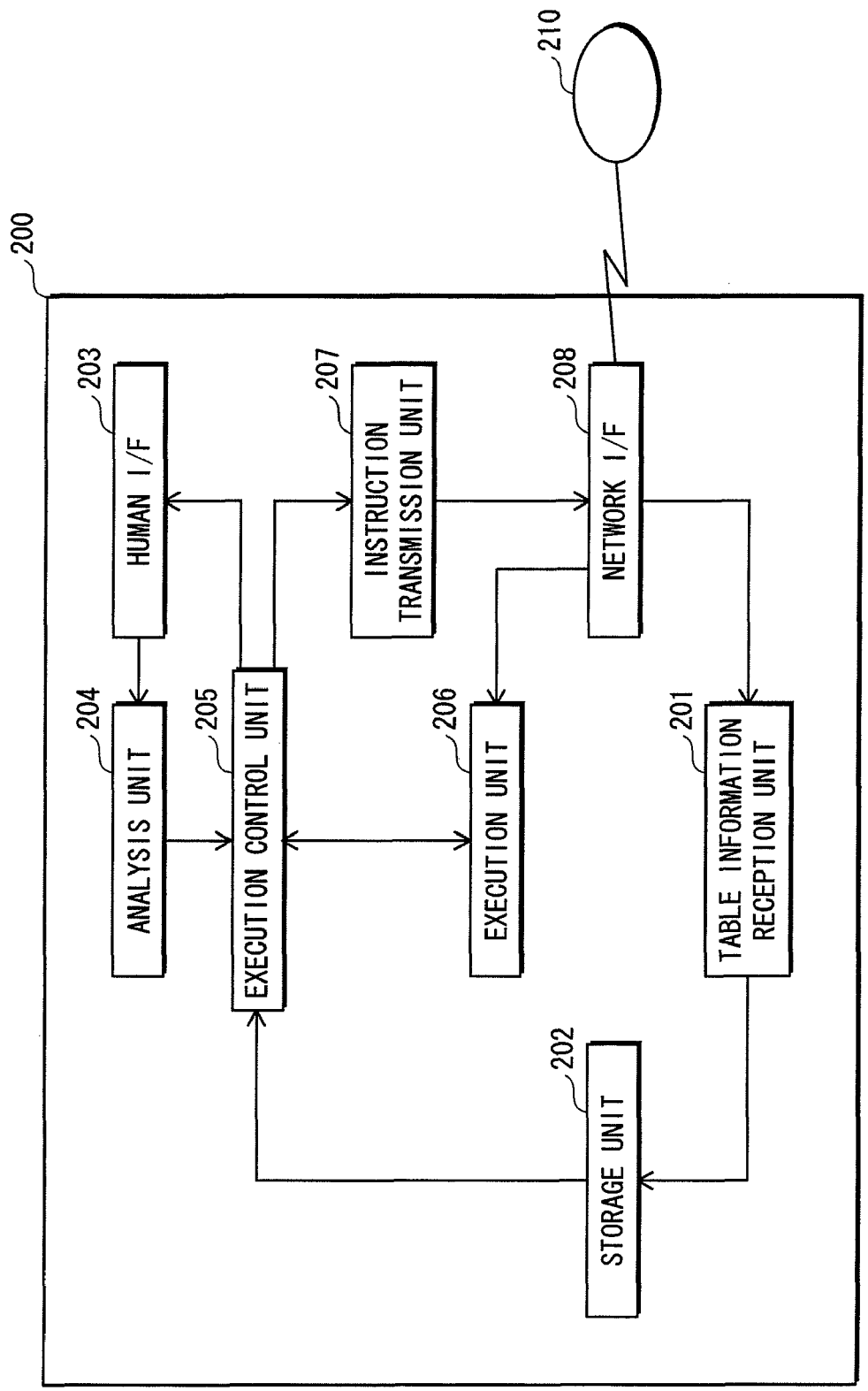
FIG. 2 shows a functional structure of an instructing device 200.

FIG. 2 shows a functional structure of an instructing device 200.

As shown in FIG. 2, the instructing device 200 includes a table information reception unit 201, a storage unit 202, a human interface 203, an analysis unit 204, an execution control unit 205, an execution unit 206, an instruction transmission unit 207, and a network interface 208.

Although not depicted in FIG. 2, the instructing device 200 also includes a CPU (Central Processing Unit). The functions of the table information reception unit 201, the analysis unit 204, the execution control unit 205, the execution unit 206, and the instruction transmission unit 207 are realized by causing the CPU to execute programs stored in the storage unit 202. Note that the power information reception unit of the present invention corresponds to the table information reception unit 201, and the selection unit of the present invention corresponds to the execution control unit 205.

The table information reception unit 201 receives function information and power information from the processing devices via the network interface 208. The function information received from each processing device indicates a device name identifying the processing device, and functions included in the processing device. The power information received from each processing device indicates the power supply reliability of the processing device. The table information reception unit 201 causes the received function information and power information to be respectively reflected in the later-described provided function table and power supply attribute table that are stored in the storage unit 202.

The storage unit 202 is a nonvolatile RAM (Random Access Memory). The storage unit 202 stores the provided function table, power supply attribute table, and criteria information table that are used when selecting a cooperating device, as well as function information pertaining to the instructing device 200. The structures of the above tables are described later.

The human interface 203 is an input/output device. The human interface 203 receives a processing request from a user via an input device such as a remote control, a keyboard, or a microphone, and sends the received processing request to the analysis unit 204. Additionally, the human interface 203 receives, from the execution control unit 205 described later, an execution result pertaining to the processing request received from the user, and outputs the execution result to an output device such as a display, a speaker, a headphone, or an LED.

The analysis unit 204 analyzes the content of the processing request received from the user via the human interface 203, and sends, to the execution control unit 205, information indicating a function required to perform the processing corresponding to the processing request (hereinafter, called the "requested function information").

The execution control unit 205 receives the requested function information from the analysis unit 204, and based on the received requested function information, judges whether cooperation with another processing device is necessary in order to execute the processing corresponding to the processing request received from the user via the human interface 203.

Upon judging that cooperation with another processing device is necessary, the execution control unit 205 selects a cooperating device, and sends, to the instruction transmission unit 207, a device name for identifying the selected cooperating device and information indicating a cooperative function to be executed by the cooperating device (hereinafter, called the "cooperative function information").

The execution control unit 205 selects the cooperating device based on the provided function table, power supply attribute table, and criteria information table that are stored in the storage unit 202. Specifically, the execution control unit 205 selects, as the cooperating device, a processing device that includes the cooperative function indicated by the cooperative function information and furthermore satisfies the criteria for power supply reliability that is required to execute the cooperative function.

Also, the execution control unit 205 controls the execution unit 206 to execute any functions included in the own device that are indicated by the requested function information, and sends, to the human interface 203, an execution result pertaining to the processing corresponding to the processing request received from the user.

In accordance with the control of the execution control unit 205, the execution unit 206 executes the functions included in the own device and sends an execution result to the execution control unit 205. For example, if the instructing device 200 is a DVD/HDD recorder that has a recording function but lacks a tuner function for receiving an H.264 format TV program, the execution unit 206 performs the recording function by recording, to an HDD, H.264 format video data received via the network interface 208 from a cooperating device that includes the required tuner function.

Based on a device name and cooperative function information received from the execution control unit 205, the instruction transmission unit 207 generates instruction data that instructs a cooperating device to execute the cooperative function, and transmits the generated instruction data to the cooperating device via the network interface 208.

The instruction data is command data for causing the execution of the cooperative function indicated by the cooperative function information received from the execution control unit 205. If the cooperative function is, for example, a tuner function for receiving an H.264 format TV program, the instruction data is command data that instructs the reception of the TV program and includes parameters such as information specifying the frequency (channel) for receiving the TV program and information specifying the broadcast time of the program.

The network interface 208 is an NIC (Network Interface Card) that connects with a network 210. Note that the network 210 is the home network 112, the home network 119, or the wide area network 114 shown in FIG. 1.

Processing Device Structure

The following describes the functional structure of the processing devices.

Figure 3:
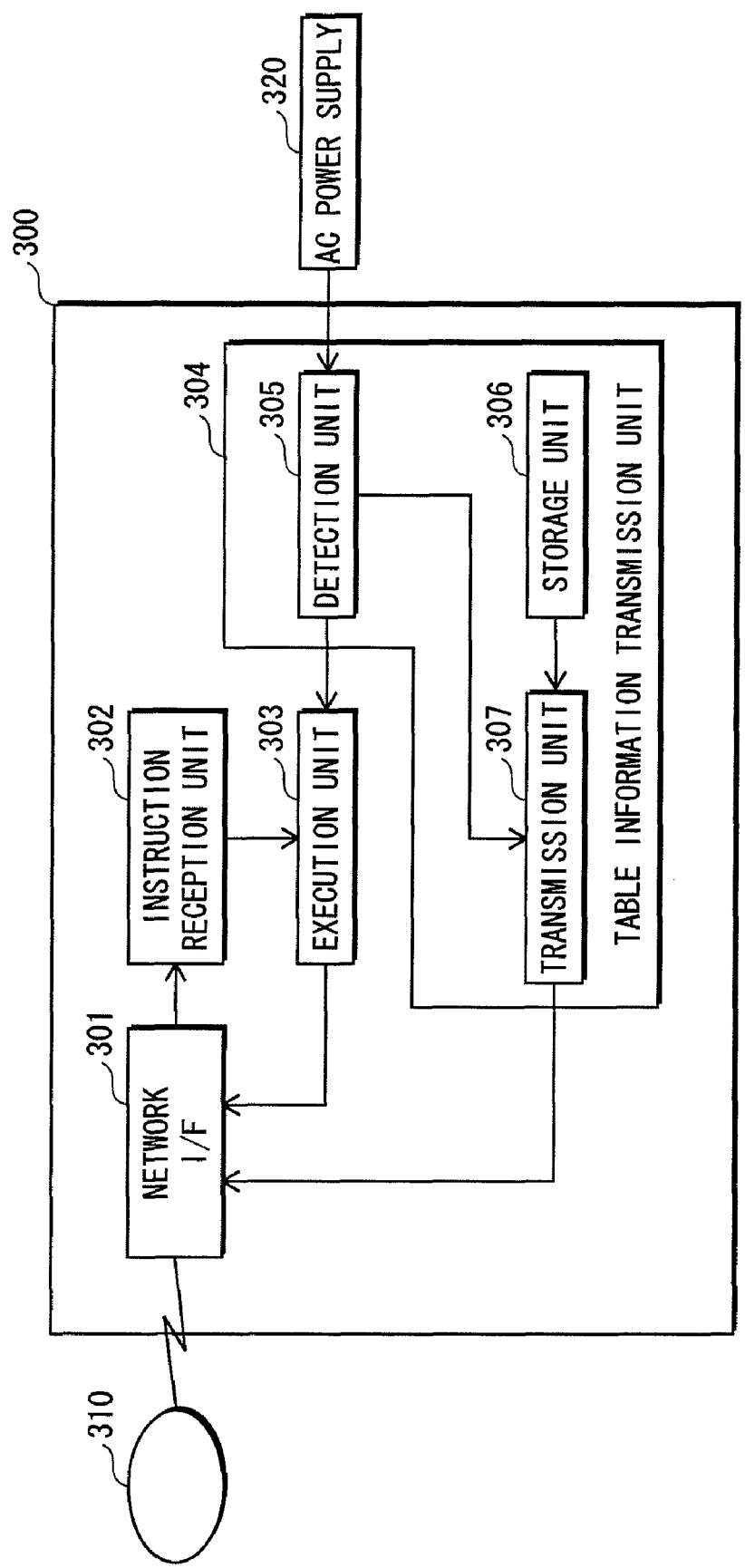
FIG. 3 shows a functional structure of a processing device 300.

FIG. 3 shows a functional structure of a processing device 300.

As shown in FIG. 3, the processing device 300 includes a network interface 301, an instruction reception unit 302, an execution unit 303, and a table information transmission unit 304.

Although not depicted in FIG. 3, the processing device 300 also includes a CPU. The functions of the instruction reception unit 302, the execution unit 303, and the table information transmission unit 304 are realized by causing the CPU to execute programs stored in a later-described storage unit 306. Note that the power information transmission unit of the present invention corresponds to the table information transmission unit 304.

The network interface 301 is an NIC that connects with a network 310. Note that the network 310 is the home network 112, the home network 119, or the wide area network 114 shown in FIG. 1.

The instruction reception unit 302 receives instruction data from the instructing device 200 via the network interface 301, and sends the received instruction data to the execution unit 303.

Based on the instruction data received from the instruction reception unit 302, the execution unit 303 executes a cooperative function and sends an execution result to the instructing device 200 via the network interface 301. For example, if the instruction data is command data for causing the execution of a tuner function for receiving an H.264 format TV program, the execution unit 303 receives a TV program in accordance with a frequency (channel), broadcast time, etc. specified as parameters, and sends video data of the received TV program to the instructing device 200 via the network interface 301.

The table information transmission unit 304 sends, to the instructing device 200 via the network interface 301, a device name identifying the processing device 300, function information indicating functions included in the processing device 300, and power information indicating a power supply reliability of the processing device 300. The table information transmission unit 304 includes a detection unit 305, the storage unit 306, and a transmission unit 307.

The detection unit 305 is a circuit for detecting that power is being supplied to the execution unit 303 from a commercial AC power supply 320 via a power cable and a power outlet. In other words, the detection unit 305 detects a startup of the processing device 300 and sends a detection signal to the transmission unit 307 each time the startup is detected.

The storage unit 306 is a ROM (Read Only Memory). The storage unit 306 stores the device name, function information, and power information of the processing device 300, and destination information indicating an address for when the above information is transmitted by the transmission unit 307. Note that the destination information has been preset by the user etc., and indicates an address, such as an IP address, of a device permits itself to be selected as a cooperating device, that is to say, a device that permits cooperative processing.

The device name and function information stored in the storage unit 306 of the processing device 300 are preset by a manufacturer etc. of the processing device 300. Also, the power information stored in the storage unit 306 of the processing device 300 is preset by the manufacturer etc. of the processing device 300 in view of the general usage of the processing device 300, or is set by an installer or user of the processing device 300 during installation, in view of the installation condition and actual usage of the processing device.

Each time a detection signal is received from the detection unit 305, that is to say, each time the processing device 300 starts up, the transmission unit 307 transmits the device name, function information, and power information stored in the storage unit 306, based on the destination information stored in the storage unit 306, via the network interface 301.

Data

The following describes the tables used by the instructing device 200.

First is a description of the provided function table.

FIG. 4 shows a data structure and exemplary content of a provided function table 400.

As shown in FIG. 4, the provided function table 400 stored in the storage unit 202 includes a device name 401 and a provided function 402 in correspondence with each other for each processing device.

The device names 401 are processing device names for identifying the processing devices that are connected to the network. The device names stored in the storage units 306 of the processing devices correspond to the device names 401. The provided functions 402 indicate functions included in the corresponding processing devices. The function information stored in the storage units 306 of the processing devices corresponds to the provided functions 402.

Taking one example from FIG. 4, the provided functions of the processing device having the device name "DEVICE A" are "MPEG2 decoder", "MPEG2 encoder", and "Down convert". In other words, the processing device having the device name "DEVICE A" includes an MPEG2 decoder function, an MPEG2 encoder function, and an MPEG2 down conversion function. Also, the provided functions of the processing device having the device name "DEVICE B" are "H.264 tuner", "MPEG2 tuner", "H.264 encoder", and "MPEG2 encoder". In other words, the processing device having the device name "DEVICE B" includes an H.264 tuner function, an MPEG2 tuner function, an H.264 encoder function, and an MPEG2 encoder function.

The following describes updating of the provided function table 400.

Since each processing device transmits the device name and function information stored in the storage unit 306 each time the processing device starts up, the table information reception unit 201 of the instructing device 200 causes the received device names and function information to be reflected in the provided function table 400.

Specifically, if the provided function table 400 does not have a record including a device name 401 that matches the received device name, a record composed of the received device name and function information is added to the provided function table 400. If the provided function table 400 has a record including a device name 401 that matches the received device name, but the provided function information 402 corresponding to the record is different from the received function information, the provided function 402 of the record is updated with the received function information.

Note that since each processing device transmits its device name and function information to the instructing device 200 each time the processing device starts up, periodically deleting the records in the provided function table 400 achieves the deletion of records for processing devices that are no longer in use due to a malfunction etc., that is to say, processing devices that are no longer connected to the network. This enables keeping the provided function table 400 in an up-to-date state.

The following describes the power supply attribute table.

FIG. 5 shows a data structure and exemplary content of a power supply attribute table 500.

As shown in FIG. 5, the power supply attribute table 500 stored in the storage unit 202 includes a device name 501, an unpluggability 502, and an estimated unplugged probability 503 in correspondence with each other for each processing device.

The device names 501 are processing device names that correspond to the device names 401 in the provided function table 400 shown in FIG. 4.

The unpluggabilities 502 indicate whether the power cable of the corresponding processing device can be unplugged from the power outlet. If a corresponding unpluggability 502 is "YES", which indicates that the power cable can be unplugged from the power outlet, the estimated unplugged probability 503 indicates an estimated level of probability that the power cable is unplugged. The power information stored in the storage units 306 of the processing devices corresponds to the unpluggabilities 502 and estimated unplugged probabilities 503.

Taking one example from FIG. 5, the processing device whose device name is "DEVICE A" has an unpluggability of "YES", which indicates that the power cable can be unplugged, and an estimated unplugged probability of "Low" (e.g., once in several months). One concrete example of the device A is a refrigerator, which is normally in use.

Taking another example from FIG. 5, the processing device whose device name is "DEVICE C" has an unpluggability of "NO", which indicates that the power cable cannot be unplugged. Concrete examples of the DEVICE C are an AV device that is embedded in a wall and receives a constant power supply from the commercial AC power supply 320, a front door intercom, and a lighting device.

The following describes updating of the power supply attribute table 500.

Similarly to the aforementioned device names and function information, since each processing device transmits the power information stored in the storage unit 306 each time the processing device starts up, the table information reception unit 201 of the instructing device 200 causes the received device names and power information to be reflected in the power supply attribute table 500.

Specifically, if the power supply attribute table 500 does not have a record including a device name 501 that matches the received device name, a record composed of the received device name and power information is added to the power supply attribute table 500. If the power supply attribute table 500 has a record including a device name 501 that matches the received device name, but the unpluggability 502 and estimated unplugged probability 504 corresponding to the record are different from the received power information, the unpluggability 502 and estimated unplugged probability 504 of the record are updated with the received power information.

The following describes the criteria information table.

FIG. 6 shows a data structure and exemplary content of a criteria information table 600.

As shown in FIG. 6, the criteria information table 600 stored in the storage unit 202 includes a function name 601, an unpluggability criteria 602, and an estimated probability criteria 603 in correspondence with each other for each cooperative function. Note that the criteria information table 600 stored in the storage unit 202 of the instructing device 200 has been preset by a manufacturer etc. of the instructing device 200.

The function names 601 are function names for identifying the corresponding cooperative functions.

The unpluggability criteria 602 and estimated probability criteria 603 indicate criteria for selecting a processing device that is to execute the corresponding cooperative function. Specifically, the unpluggability criteria 602 indicates whether a processing device whose power cable can be unplugged from a power outlet is permitted to be selected as the processing device that is to execute the corresponding cooperative function. The estimated probability criteria 603 indicates a permissible unplugged probability level if the corresponding unpluggability criteria 602 indicates that a processing device whose power cable can be unplugged from a power outlet is permitted to be selected.

In the exemplary case of the MPEG2 decoder cooperative function in FIG. 6, the corresponding function name is "MPEG2 decoder", the unpluggability criteria for the processing device that is execute the MPEG2 decoder function is "YES", which indicates that a processing device whose power cable can be unplugged from a power outlet is permitted to be selected, and the estimated probability criteria is "Normal or lower", which indicates that an unplugged probability of, for example, once a month or less is permissible.

In the exemplary case of the H.264 tuner cooperative function in FIG. 6, the corresponding function name is "H.264 tuner", and the unpluggability criteria for the processing device that is to execute the H.264 tuner function is "NO", which indicates that a processing device whose power cable can be unplugged from a power outlet is not permitted to be selected.

Operations

The following describes operations of the instructing device 200 having the above structure and handling the above data.

Figure 7:
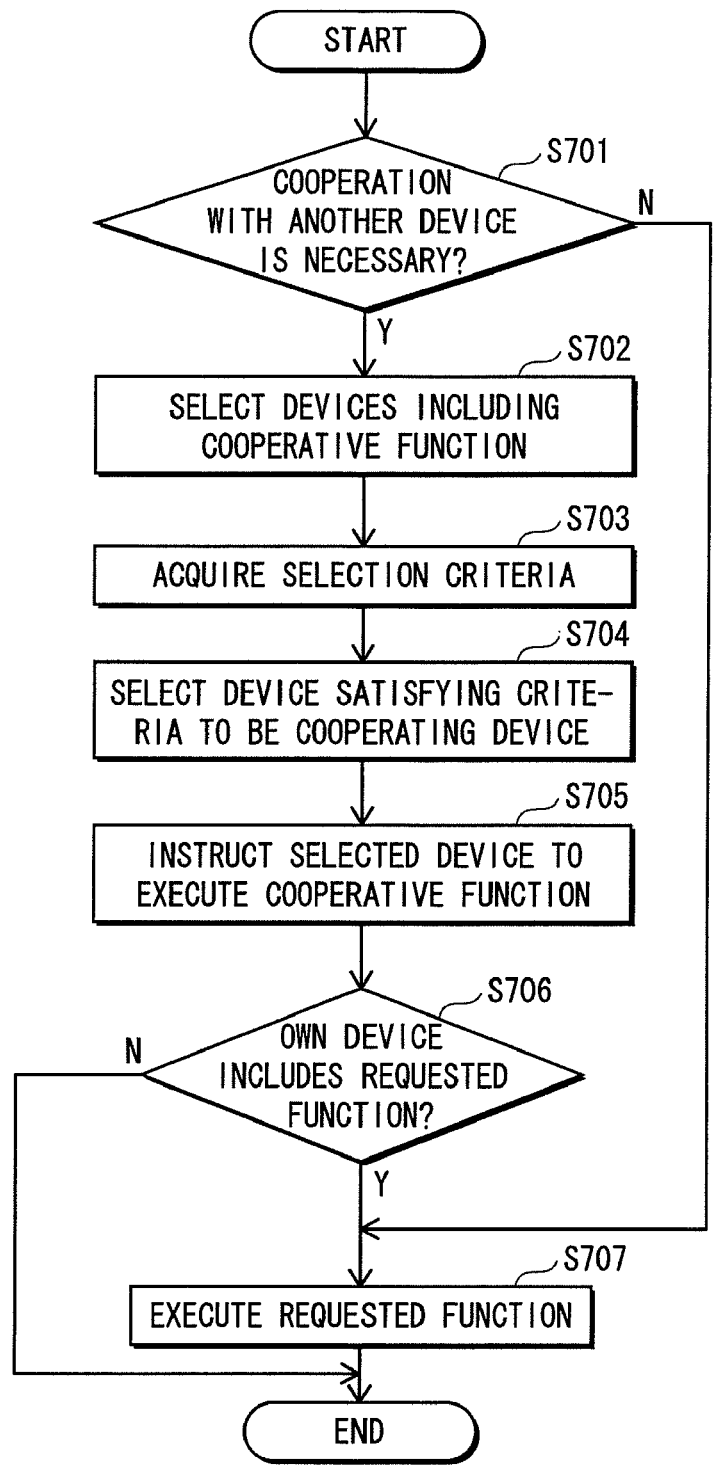
FIG. 7 is a flowchart showing processing performed by the instructing device 200 of embodiment 1 to select a cooperating device.

FIG. 7 is a flowchart showing processing performed by the instructing device 200 to select a cooperating device.

The analysis unit 204 receives a processing request from the user via the human interface 203, analyzes the content of the processing request, and sends, to the execution control unit 205, requested function information indicating a function required to perform the processing corresponding to the received processing request.

Upon receiving the requested function information from the analysis unit 204, the execution control unit 205 judges whether cooperation with another processing device is necessary to perform the processing corresponding to the processing received from the user via the human interface 203 (step S701). Specifically, if all of the functions indicated by the received requested function information are functions indicated by the function information stored in the storage unit 202 of the own device, the execution control unit 205 judges that cooperation is not necessary. If any of the functions indicated by the received requested function information are functions not indicated by the function information stored in the storage unit 202 of the own device, the execution control unit 205 judges that cooperation is necessary.

In a case of judging that cooperation with another processing device is necessary (step S701:Y), the execution control unit 205 references the provided function table 400 stored in the storage unit 202 and selects all processing device that include the function not included in the own device (the cooperative function) as cooperating device candidates (step S702), and then acquires the unpluggability criteria and estimated probability criteria for the processing device that is to execute the cooperative function from the criteria information table 600 stored in the storage unit 202 (step S703).

The execution control unit 205 then references the power supply attribute table 500 and, from among the cooperating device candidates selected in step S702, selects, as the cooperating device, one processing device that satisfies the unpluggability criteria and estimated probability criteria acquired in step S703 (step S704), and sends a device name identifying the selected cooperating device and cooperative function information indicating the cooperative function to the instruction transmission unit 207.

Based on the device name and cooperative function information received from the execution control unit 205, the instruction transmission unit 207 generates instruction data for instructing the cooperating device indicated by the device name to execute the cooperative function, and transmits the generated instruction data to the cooperating device via the network interface 208 (step S705). Note that information regarding the necessary parameters is acquired from the analysis unit 204 when generating the instruction data. Information such as an IP address indicating the recipient cooperating device is necessary in order to transmit the instruction data to the cooperating device. This information may be preset by the user etc., and may include a device name and an address, such as an IP address, in correspondence with each other for each processing device. Alternatively, since information such as a transmission-source IP address is collected when device names etc. are received from the processing devices, such information may be used when transmitting the instruction data.

The execution control unit 205 judges whether the own device includes the functions required to perform the processing corresponding to the processing request received from the user (step S706). Specifically, if a function indicated by the received requested function information is a function indicated by the function information of the own device, the execution control unit 205 judges that the own device includes a requested function that is to be executed.

Upon judging that the own device includes a function to be executed (step S706:Y), the execution control unit 205 causes the execution unit 206 to execute the requested function (step S707), and ends the processing for selecting a cooperating device.

Upon judging in step S706 that the own device does not include any of the functions required to perform the processing corresponding to the received processing request (step S706:N), the execution control unit 205 ends the processing for selecting a cooperating device.

If the execution control unit 205 judges in step S701 that cooperation with another processing device is not necessary (step S701:N), processing proceeds to step S707.

Concrete Example of Operation

The following describes a concrete example of the operations of the instructing device 200 with reference to FIG. 7, using the exemplary content of the provided function table 400 of FIG. 4, the power supply attribute table 500 of FIG. 5, and the criteria information table 600 of FIG. 6.

Note that in the following example, the instructing device 200 is a DVD/HDD recorder including a recording function and a playback function, and the instructing device 200 has received, from the user, a processing request that requests the recording of an H.264 format TV program.

The analysis unit 204 receives the processing request (the request to record the H.264 format TV program) from the user via the human interface 203 of the instructing device 200, analyzes the content of the processing request, and sends, to the execution control unit 205, requested function information indicating functions required to perform the processing corresponding to the received processing request (an H.264 tuner function and a recording function).

Upon receiving the requested function information from the analysis unit 204, the execution control unit 205 judges whether cooperation with another processing device is necessary to perform the processing corresponding to the processing request received from the user via the human interface 203 (step S701).

In this case, the execution control unit 205 judges that cooperation is necessary (step S701:Y) since not all of the functions indicated by the received requested function information (the H.264 tuner function and the recording function) are functions indicated by the function information (the recording function and the playback function) stored in the storage unit 202 of the own device, that is to say, since the H.264 tuner function is not indicated by the function information of the own device. The execution control unit 205 then references the provided function table 400 stored in the storage unit 202 and selects all processing devices that include the cooperative function (the H.264 tuner function) as cooperating device candidates (step S702).

The execution control unit 205 then acquires the unpluggability criteria and estimated probability criteria for the processing device that is to execute the cooperative function from the criteria information table 600 stored in the storage unit 202 (step S703). Specifically, the execution control unit 205 acquires the unpluggability criteria 602 "NO" (i.e., a processing device whose power cable can be unplugged from the power outlet is not permitted to be selected) corresponding to the cooperative function (the H.264 tuner function).

From among the cooperating device candidates (DEVICE B and DEVICE C) selected in step S702, the execution control unit 205 selects, as the cooperating device, a processing device (DEVICE C) whose upluggability 502 in the power supply attribute table 500 satisfies the unpluggability criteria 602 ("NO") acquired in step S703 (step S704), and sends a device name (DEVICE C) identifying the selected cooperating device and cooperative function information indicating the cooperative function (H.264 tuner) to the instruction transmission unit 207.

Based on the device name (DEVICE C) and cooperative function information (H.264 tuner) received from the execution control unit 205, the instruction transmission unit 207 generates instruction data for instructing the cooperating device indicated by the device name to execute the cooperative function, and transmits the generated instruction data to the cooperating device via the network interface 208 (step S705).

The execution control unit 205 judges whether the own device includes the functions required to perform the processing corresponding to the processing request received from the user (step S706). Since a function indicated by the function information of the own device (the recording function) is one of the functions indicated by the received requested function information (the H.264 tuner function and the recording function), the execution control unit 205 judges that the own device includes a requested function that is to be executed (step S706:Y), and causes the execution unit 206 to execute the requested function (the recording function). With use of conventional technology for cooperative processing between devices, the execution unit 206 performs processing for recording, to an HDD (not depicted), H.264-compliant video data that is received from the cooperating device (DEVICE C) (step S707), whereafter processing for selecting a cooperating device ends.

In this way, the instructing device 200 selects, as the cooperating device, a processing device that satisfies the criteria for power supply reliability corresponding to the cooperative function. This enables causing a function during which an interruption in execution must not occur, such as a tuner function, to be executed by a processing device that can be expected to have a stable power supply, and lowers the possibility of an interruption in cooperative processing due to the power supply to the cooperating device that is executing cooperative processing being cut off.

Note that if a plurality of processing devices satisfy the unpluggability criteria and estimated probability criteria in step S704, an arbitrary one of the processing devices may be selected as the cooperating device. For example, if the processing devices "DEVICE A" and "DEVICE B", which are first in the display order of device names as sorted in the power supply attribute table 500, both satisfy the unpluggability criteria and estimated probability criteria, "DEVICE A" that is first in the display order may be selected as the cooperating device.

Modification 1

Overview

In embodiment 1, the instructing device 200 selects the cooperating device with use of the power supply attribute table 500, which includes the unpluggabilities 502 indicating whether the power cable of the corresponding processing device can be unplugged from the power outlet and the estimated unplugged probabilities 503 indicating the estimated level of probability that the power cable of the corresponding processing device is unplugged.

The following describes a modification in which the power supply attribute table 500 has been replaced with a power supply attribute table composed of different items, focusing on differences from embodiment 1.

Data

The following describes the power supply attribute table used by the instructing device 200.

Figure 8:
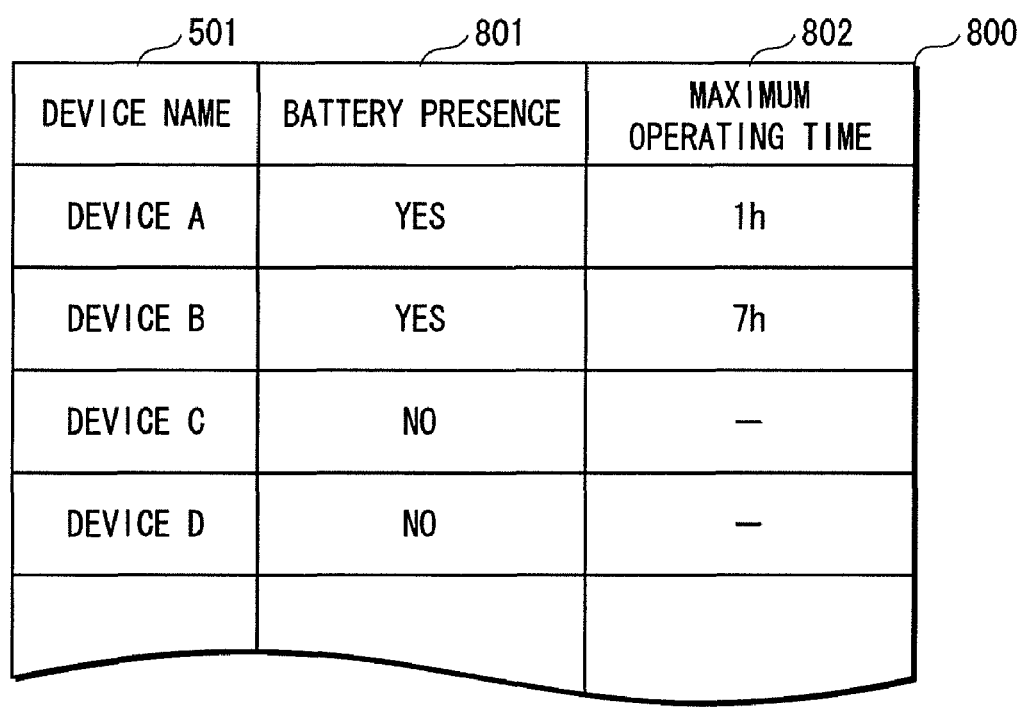
FIG. 8 shows a data structure and exemplary content of a power supply attribute table 800.

FIG. 8 shows a data structure and exemplary content of a power supply attribute table 800.

As shown in FIG. 8, the power supply attribute table 800 stored in the storage unit 202 of the instructing device 200 includes a device name 501, a battery presence 801, and a maximum operating time 802 in correspondence with each other for each processing device. A description of the device names 501 has been omitted due to being the same as in the power supply attribute table 500.

The battery presences 801 indicate whether the corresponding processing device includes an internal battery. The maximum operating times 802 indicate the maximum operating time of the battery of the corresponding processing device, if the corresponding battery presence 801 is "YES", that is to say, if the corresponding processing device includes a battery. The power information stored in the storage unit 306 of each processing device has been preset by the manufacturer etc. of the processing device, and corresponds to the battery presences 801 and maximum operating times 802.

Taking one example from FIG. 8, the processing device whose device name is "DEVICE A" has a battery presence of "YES", which indicates that a battery is included, and a battery-based maximum operating time of "1 HOUR". The processing device whose device name is "DEVICE C" has a battery presence of "NO", which indicates that a battery is not included.

Note that a description of updating of the power supply attribute table 800 has been omitted due to being similar to the updating of the power supply attribute table 500.

The following describes the criteria information table.

FIG. 9 shows a data structure and exemplary content of a criteria information table 900.

As shown in FIG. 9, the criteria information table 900 stored in the storage unit 202 includes a function name 601, a battery criteria 901, and a maximum operating time criteria 902 in correspondence with each other for each cooperative function.

Note that the criteria information table 900 stored in the storage unit 202 of the instructing device 200 has been preset by a manufacturer etc. of the instructing device 200. Also, a description of the function names 601 has been omitted due to being the same as in the criteria information table 600.

The battery criteria 901 and maximum operating time criteria 902 indicate criteria for selecting a processing device that is to execute the corresponding cooperative function. Specifically, the battery criteria 901 indicates whether a processing device that includes a battery is permitted to be selected as the processing that is to execute the corresponding cooperative function. The maximum operating time criteria 902 indicates a permissible battery-based maximum operating time if the corresponding battery criteria 901 indicates that a processing device including a battery is permitted to be selected.

In the exemplary case of the MPEG2 decoder cooperative function in FIG. 9, the corresponding function name is "MPEG2 decoder", the battery criteria for the processing device that is to execute the MPEG2 decoder function is "YES", which indicates that a processing device including a battery is permitted to be selected, and the permissible maximum operating time is "2 hours or more".

In the exemplary case of the H.264 tuner cooperative function in FIG. 9, the corresponding function name is "H.264 tuner", and the battery criteria for the processing device that is to execute the H.264 tuner function is "NO", which indicates that a processing device including a battery is not permitted to be selected.

In a processing device that includes a battery and is operating on the battery, cooperative processing will be interrupted if the battery runs out during the cooperative processing. Therefore, if a function during which an interruption in execution must not occur, such as a tuner function, is caused to be executed by a processing device that does not include a battery, it is possible to prevent an interruption in cooperative processing due to battery exhaustion, and lower the possibility of an interruption in cooperative processing due to the power supply to the cooperating device being cut off.

Also, in the case of causing a cooperative function to be executed by a processing device that includes a battery, if a processing device that has a longer battery-based maximum operating time is selected as the cooperating device, it is possible to lower the possibility of battery exhaustion during cooperative processing, and lower the possibility of an interruption in cooperative processing due to battery exhaustion.

Embodiment 2

Overview

In embodiment 1, the processing device 300 transmits the power information pre-stored in the storage unit 306 to the instructing device 200.

In embodiment 2, each time the supply of power from a commercial AC power supply to the execution unit 303 in a processing device is detected, the processing device updates the power information stored in the storage unit 306, and transmits the updated power information to an instructing device of embodiment 2. The following description focuses on differences from embodiment 1.

Instructing Device Structure

First is a description of a functional structure of the instructing device of embodiment 2.

The instructing device 200 of embodiment 2 has basically the same structure as the instructing device 200 of embodiment 1. However, the execution control unit 205 in the instructing device 200 of embodiment 1 selects a cooperating device based on the provided function table, power supply attribute table, and criteria information table that are stored in the storage unit 202, while in contrast, the execution control unit 205 in the instructing device 200 of embodiment 2 selects a cooperating device based on only the provided function table and the power supply attribute table. In other words, embodiment 2 differs from embodiment 1 in that the criteria information table is not used when selecting a cooperating device.

Processing Device Structure

Next is a description of a functional structure of a processing device of embodiment 2.

Figure 10:
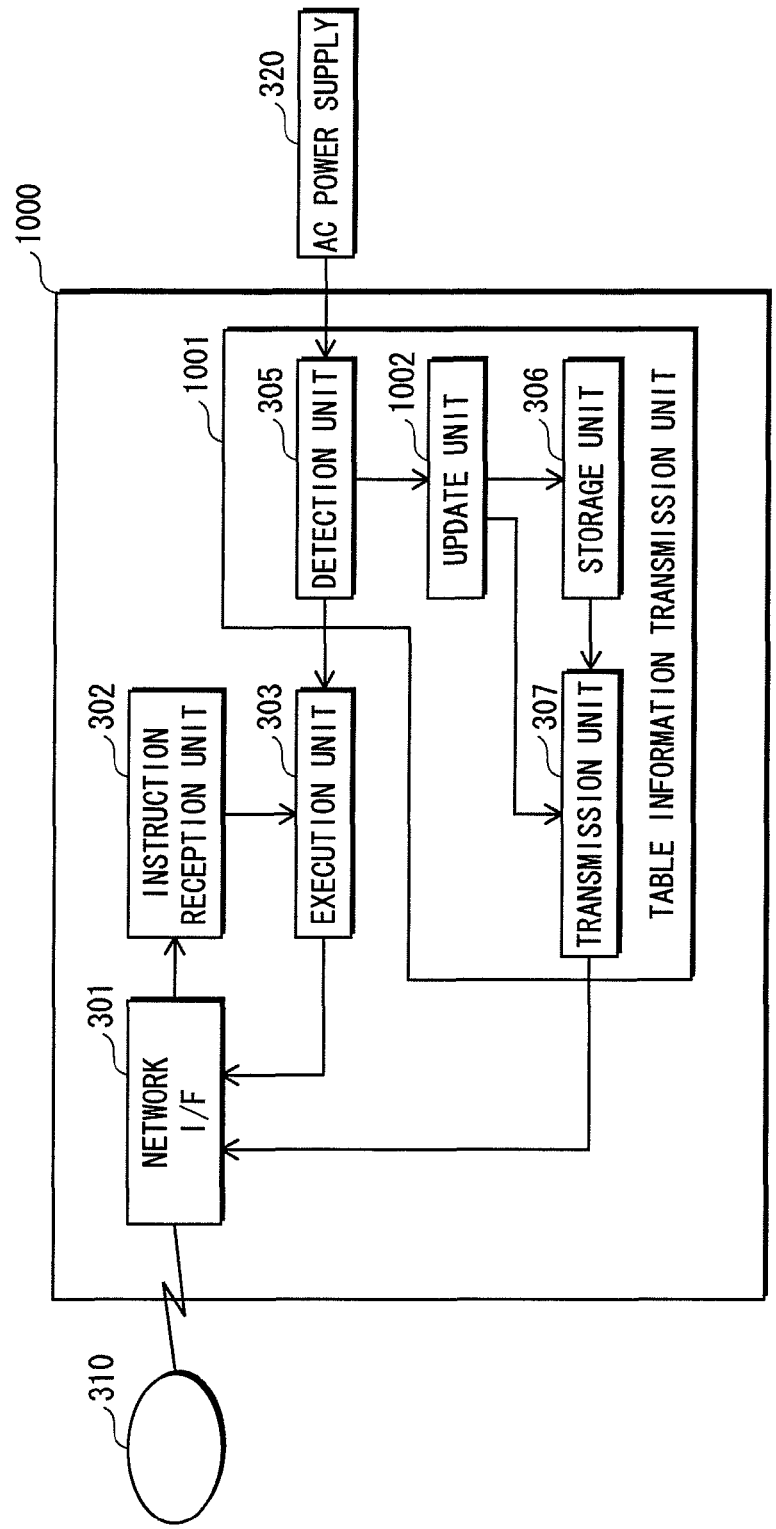
FIG. 10 shows a functional structure of a processing device 1000.

FIG. 10 shows a functional structure of a processing device 1000.

As shown in FIG. 10, the processing device 1000 includes the network interface 301, the instruction reception unit 302, the execution unit 303, and a table information transmission unit 1001. The following describes only the table information transmission unit 1001 since the other units are similar to the corresponding units in the processing device 300 of embodiment 1.

Note that although not depicted in FIG. 10, the processing device 1000 includes a CPU. The functions of the table information transmission unit 1001 are realized by causing the CPU to execute a program stored in the storage unit 306.

The table information transmission unit 1001 has basically the same functions as the table information transmission unit 304 of embodiment 1, with the exception that the table information transmission unit 1001 has the ability to update the power information.

Specifically, the table information transmission unit 1001 includes the detection unit 305, the storage unit 306, the transmission unit 307, and an update unit 1002. Descriptions of the units other the update unit 1002 have been omitted since they are similar to the corresponding units of the table information transmission unit 304. However, each time power supply is detected, the detection unit 305 of the table information transmission unit 1001 transmits the detection signal to the update unit 1002 instead of the transmission unit 307.

Each time the detection signal is received from the detection unit 305, that is to say, each time power is supplied from the commercial AC power supply 320 to the execution unit 303, the update unit 1002 increments the power supply information stored in the storage unit 306 by one, that is to say, increments by one the number of times that the power supply from the commercial AC power supply 320 to the execution unit 303 has been cut off. Here, the power information has an initial value of "0", and is preset by the manufacturer etc. of the processing device 1000.

Data

The following describes the power supply attribute table used by the instructing device 200 of embodiment 2.

FIG. 11 shows a data structure and exemplary content of a power supply attribute table 1100.

As shown in FIG. 11, the power supply attribute table 1100 stored in the storage unit 202 of the instructing device 200 of embodiment 2 includes a device name 501 and a cut-off count 1101 in correspondence with each other for each processing device. A description of the device names 501 has been omitted since they are the same as the device names 501 of the power supply attribute table 500 shown in FIG. 5.

The cut-off count 1101 indicates the number of times that the power supply from the commercial AC power supply 320 to the execution unit 303 of the corresponding processing device has been cut off, that is to say, indicates the number of times that the power supply to the execution unit 303 has been cut off by the main power switch being turned off, the power cable being unplugged, or the like. The power information stored in the storage unit 306 of each processing devices corresponds to the cut-off count 1101.

Taking one example from FIG. 11, the processing device whose device name is "DEVICE A" has a power supply cut-off count of "17.4", and the processing device whose device name is "DEVICE C" has a power supply cut-off count of "0".

In other words, "DEVICE C", in which the power supply from the commercial AC power supply 320 to the execution unit 303 has been cut off "0" times, can be expected to have a more stable power supply than "DEVICE A". This shows that selecting "DEVICE C" as the cooperating device enables lowering the possibility that cooperative processing will be interrupted due to the power to the cooperating device being cut off.

Note that a description of updating of the power supply attribute table 1100 has been omitted due to being similar to the updating of the power supply attribute table 500.

Operations

The following describes operations of the instructing device 200 of embodiment 2.

Figure 12:
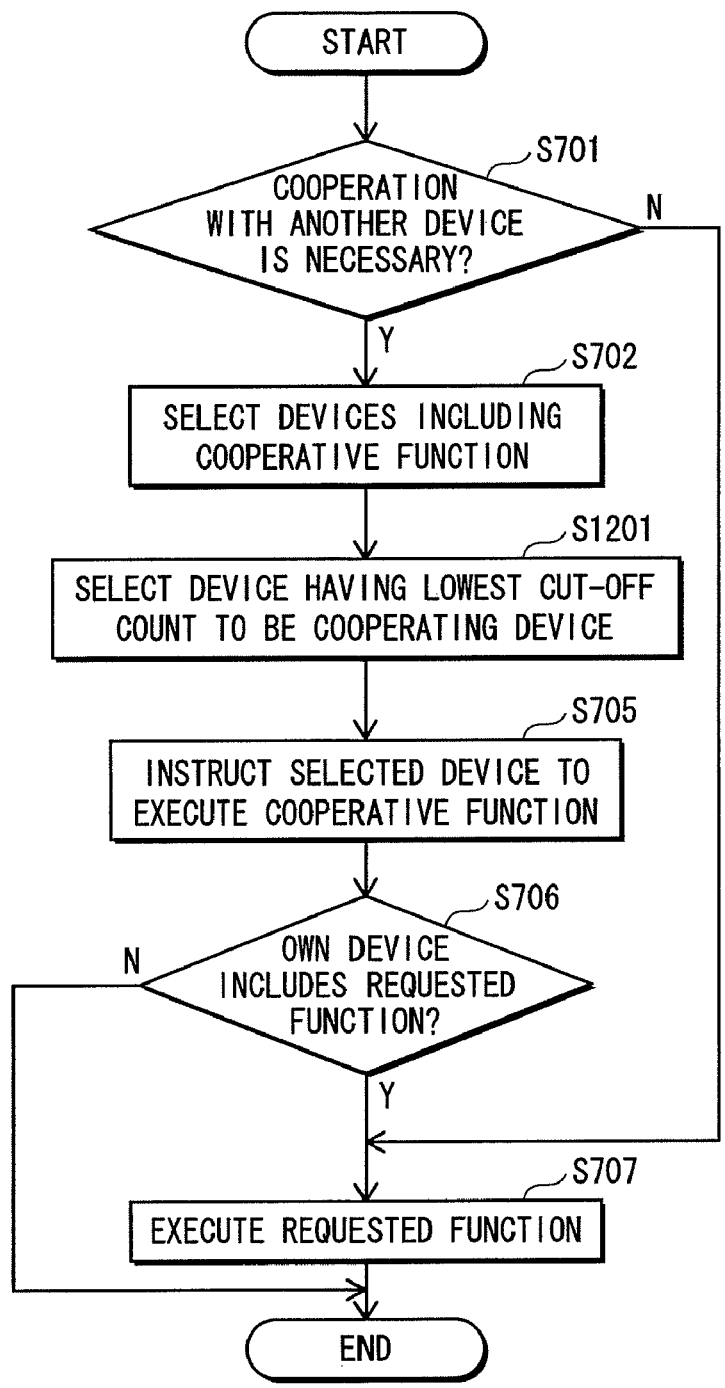
FIG. 12 is a flowchart showing processing performed by the instructing device 200 of embodiment 2 to select a cooperating device.

FIG. 12 is a flowchart showing processing performed by the instructing device 200 of embodiment 2 to select a cooperating device. The cooperating device selection processing shown in FIG. 12 is the same as the cooperating device selection processing shown in FIG. 7 and performed by the instructing device 200 of embodiment 1, with the exception that steps S703 and S704 have been replaced with step S1201. Accordingly, the following describes only step S1201.

In step S1201, the execution control unit 205 in the instructing device 200 of embodiment 2 references the power supply attribute table 1100 and, from among the processing device candidates selected in step S702, selects, as the cooperating device, a processing device that has the lowest cut-off count 1101.

The following describes the processing of step S1201 using the exemplary content of the provided function table 400 shown in FIG. 4 and the power supply attribute table 1100 shown in FIG. 11. Note that in step S702, the two processing devices whose device names are "DEVICE B" and "DEVICE C" have been selected as cooperating device candidates based on the provided function table 400 shown in FIG. 4.

The execution control unit 205 in the instructing device 200 of embodiment 2 references the power supply attribute table 1100 and, from among the processing device candidates (DEVICE B and DEVICE C) selected in step S702, selects, as the cooperating device, the processing device that has the lowest cut-off count 1101 (DEVICE C) (step S1201).

In this way, the instructing device 200 of embodiment 2 selects the processing device whose power supply has been cut off the lowest number of times from among the processing devices that include the cooperative function. This enables causing a function during which an interruption in execution must not occur, such as a tuner function, to be executed by a cooperating device that can be expected to have a relatively stable power supply, and lowers the possibility of an interruption in cooperative processing due to the power supply to the cooperating device that is executing the cooperative function being cut off.

Although embodiment 2 describes an example of selecting a cooperating device without using the criteria information table, it is of course possible to perform cooperating device selection processing that is similar to the instructing device 200 of embodiment 1, by setting a criteria for a permissible cut-off count for each cooperative function as a criteria information table of embodiment 2, and storing the criteria information table in the storage unit 202 of the instructing device 200 of embodiment 2.

Modification 2

Overview

In embodiment 2, the update unit 1002 of the processing device lobo updates the number of times that the power supply to the execution unit 303 has been cut off, each time the detection unit 305 detects that the power supply to the execution unit 303 has been cut off by the main power switch being turned off, the power cable being unplugged, or the like. In other words, the update unit 1002 updates the number of times that power supply has been cut off, without distinguishing between the cause for the power supply being cut off.

The following describes a modification in which the update unit 1002 updates a different cut-off count for each cause for the power supply to the execution unit 303 being cut off. The following description focuses on differences from embodiment 2. Note that the instructing device 200 of modification 2 is the same as the instructing device 200 of embodiment 2, with the exception of the content of the power supply attribute table.

Processing Device Structure

First is a description of the functional structure of a processing device 1300 of modification 2.

Figure 13:
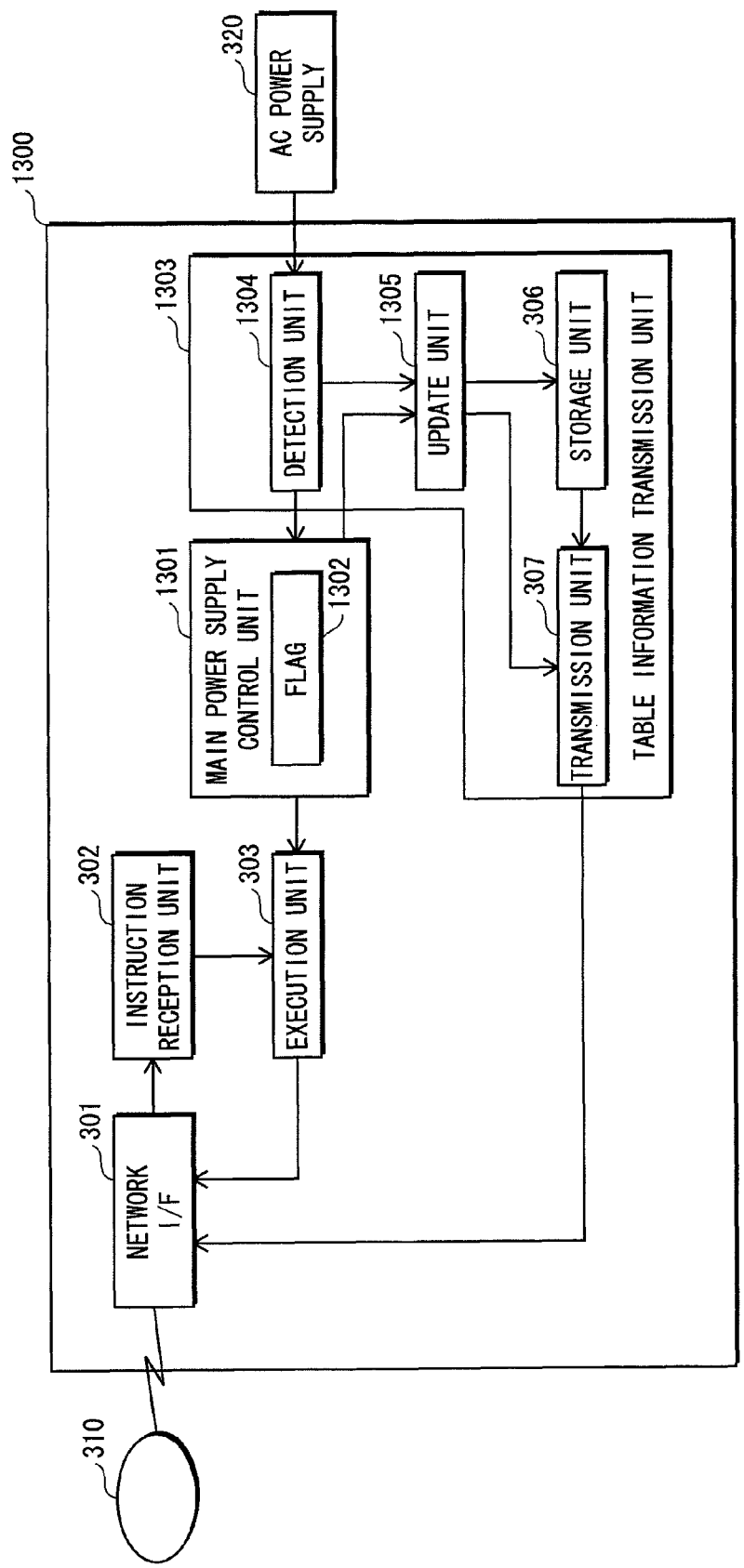
FIG. 13 shows a functional structure of a processing device 1300.

FIG. 13 shows a functional structure of the processing device 1300.

As shown in FIG. 13, the processing device 1300 includes the network interface 301, the instruction reception unit 302, the execution unit 303, a main power supply control unit 1301, and a table information transmission unit 1303. The following describes only the main power supply control unit 1301 and table information transmission unit 1303 since the other units are similar to the corresponding units in the processing device 1000 of embodiment 2.

Note that although not depicted in FIG. 13, the processing device 1300 includes a CPU. The functions of the main power supply control unit 1301 and table information transmission unit 1303 are realized by causing the CPU to execute programs stored in the storage unit 306.

The main power supply control unit 1301 controls whether power from the commercial AC power supply 320 is supplied to the execution unit 303.

Specifically, the main power supply control unit 1301 includes a user-operable main power supply switch that, when pressed, switches between a state in which power is supplied to the execution 303 (hereinafter, called the "supply state"), and a state in which power is not supplied to the execution unit 303 (hereinafter, called the "cut-off state"). Also, the main power supply control unit 1301 stores flag information 1302 that identifies whether the current state is the supply state or cut-off state, and updates the flag information 1302 to indicate the current state each time switching has been performed.

Note that even if the main power switch is pressed and the main power supply control unit 1301 enters the cut-off state, power is supplied from the commercial AC power supply 320 to the main power supply control unit 1301 as long as the power cable of the processing device 1300 remains inserted in the power outlet. Also, the flag information 1302 is set to indicate the cut-off state while the power cable of the processing device 1300 is inserted into the power outlet and the power supply from the commercial AC power supply 320 to the main power supply control unit 1301 is started.

The table information transmission unit 1303 has basically the same functions as the table information transmission unit 1001 of embodiment 2, with the exception that the table information transmission unit 1303 updates items in the power information according to the cause for the power supply to the execution unit 303 being cut off.

The table information transmission unit 1303 includes the storage unit 306, the transmission unit 307, a detection unit 1304, and an update unit 1305. The following describes only the detection unit 1304 and update unit 1305 since the other units are similar to the corresponding units of the table information transmission unit 1001.

The detection unit 1304 is a circuit that detects that power is being supplied from the commercial AC power supply 320 via the power cable and power outlet, that is to say, detects that power is being supplied from the commercial AC power supply 320 due to the insertion of the previously unplugged power cable into the power outlet, and sends a detection signal to the update unit 1305 each time power supply is detected.

The update unit 1305 judges the cause for the power supply to the execution 303 being cut off according to whether the detection signal is being received from the detection unit 1304 and according to changes in the state of the main power supply control unit 1301 as indicated by the flag information 1302. In accordance with the cause for the power supply being cut off, the update unit 1305 updates the appropriate cut-off count of the power information stored in the storage unit 306.

Specifically, if the flag information 1302 changes from the cut-off state to the supply state while the detection signal is being received from the detection unit 1304, the update unit 1305 judges that the cause for the power supply being cut off is that the power cable has been unplugged, and increments the AC power supply cut-off count in the power information stored in the storage unit 306 by one. The AC power supply cut-off count indicates the number of times that the power cable has been unplugged.

On the other hand, if the flag information 1302 changes from the cut-off state to the supply state and the detection signal is not being received from the detection unit 1304, the update unit 1305 judges that the cause for the power supply being cut off is that the main power switch has been turned off, and increments the main power supply cut-off count in the power information stored in the storage unit 306 by one. The main power supply cut-off count indicates the number of times that the main power switch has been turned off.

Note that the AC power supply cut-off count and main power supply cut-off count have an initial value of "0", and are preset by the manufacturer etc. of the processing device 1300.

Data

The following describes the power supply attribute table used by the instructing device 200 of modification 2.

FIG. 14 shows a data structure and exemplary content of a power supply attribute table 1400.

As shown in FIG. 14, the power supply attribute table 1400 stored in the storage unit 202 of the instructing device 200 of modification 2 includes a device name 501, an AC power supply cut-off count 1401, and a main power supply cut-off count 1402 in correspondence with each other for each processing device. A description of the device names 501 has been omitted since they are the same as the device names 501 of the power supply attribute table 1100 shown in FIG. 11.

The AC power supply cut-off count 1401 indicates the number of times that the power supply from the commercial AC power supply 320 to the corresponding processing device has been cut off, that is to say, the number of times that the power supply has been cut off due to the power cable being unplugged. Also, the main power supply cut-off count 1402 indicates the number of times that power supply to the execution unit 303 in the corresponding processing device has been cut off due to the main power switch being turned off. The power information stored by the storage unit 306 of each processing device corresponds to the AC power supply cut-off count 1401 and main power supply cut-off count 1402.

Taking one example from FIG. 14, the processing device whose device name is "DEVICE B" has an AC power supply cut-off count of "160", that is to say, the power supply has been cut off "160" times due to the power cable being unplugged, and has a main power supply cut-off count of "10", that is to say, the power supply to the execution unit 303 has been cut off "10" times due to the main power switch being turned off.

A processing device that has a high AC power supply cut-off count 1401, such as the processing device whose device name is "DEVICE B", is a processing device on which a user frequently performs an operation that has the danger of leading to a malfunction of the processing device, such as unplugging the power cable while the main power switch is in the ON state.

In view of this, the processing device that has the lowest AC power supply cut-off count 1401 can be expected to have a relatively stable power supply. Selecting the processing device that has the lowest AC power supply cut-off count 1401 as the cooperating device enables causing a function during which an interruption in execution must not occur, such as a tuner function, to be executed by a cooperating device that can be expected to have a relatively stable power supply, and lowers the possibility of an interruption in cooperative processing due to the power supply to the cooperating device that is executing the cooperative function being cut off.

If a plurality of processing devices that have the same lowest AC power supply cut-off count 1401 exist, the one of the these processing devices that has the lowest main power supply cut-off count 1402 is selected as the cooperating device. This similarly lowers the possibility of an interruption in cooperative processing due to the power supply to the cooperating device that is executing the cooperative function being cut off.

Note that a description of updating of the power supply attribute table 1400 has been omitted due to being similar to the updating of the power supply attribute table 1100.

Modification 3

Overview

In modification 2, the power supply attribute table 1400 includes the AC power supply cut-off counts 1401 that indicate the number of times that the power supply from the commercial AC power supply 320 to the corresponding processing devices has been cut off and the main power supply cut-off counts 1402 that indicate the number of times that power supply to the execution unit 303 in the processing devices has been cut off due to the main power switch being turned off.

The following describes a modification in which the main power supply cut-off count 1402 of the power supply attribute table 1400 has been replaced with the time for which the power supply to the execution unit 303 has been cut off due to the main power switch being turned off (hereinafter, called the "main power supply cut-off time". The following description focuses on differences from modification 2. Note that the instructing device 200 of modification 3 is the same as the instructing device 200 of modification 2, with the exception of the content of the power supply attribute table.

Processing Device Structure

First is a description of the functional structure of a processing device 1500 of modification 3.

Figure 15:
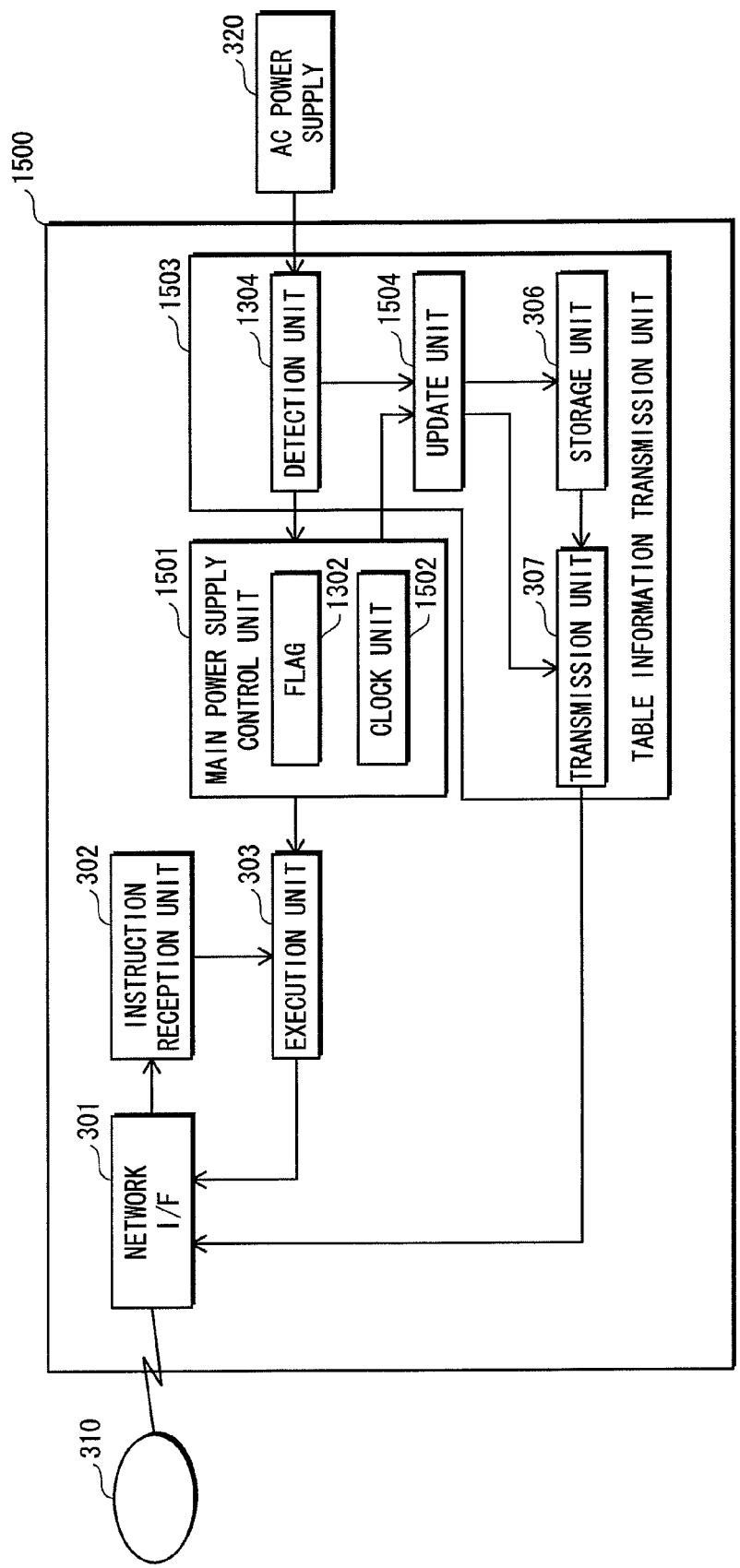
FIG. 15 shows a functional structure of a processing device 1500.

FIG. 15 shows a functional structure of the processing device 1500.

As shown in FIG. 15, the processing device 1500 includes the network interface 301, the instruction reception unit 302, the execution unit 303, a main power supply control unit 1501, and a table information transmission unit 1503. The following describes only the main power supply control unit 1501 and table information transmission unit 1503 since the other units are similar to the corresponding units in the processing device 1300 of modification 2.

Note that although not depicted in FIG. 15, the processing device 1500 includes a CPU. The functions of the main power supply control unit 1501 and table information transmission unit 1503 are realized by causing the CPU to execute programs stored in the storage unit 306.

The main power supply control unit 1501 performs the functions of the main power supply control unit 1301 of modification 2, and additionally measures the main power supply cut-off time, which indicates the time for which the power supply to the execution unit 303 has been cut off due to the main power switch being turned off. The measuring of the main power supply cut-off time is realized by a clock unit 1502 included in the main power supply control unit 1501. The clock unit 1502 is a timer circuit that measures an elapsed time beginning when the main power switch is turned off, that is to say, when the main power supply control unit 1501 enters the cut-off state, and ending the next time the main power switch is operated by the user (turned on), that is to say, when the main power supply control unit 1501 enters the supply state.

The table information transmission unit 1503 has basically the same functions as the table information transmission unit 1303 of modification 2, with the exception that the table information transmission unit 1503 causes the power information to indicate the main power supply cut-off time measured by the clock unit 1502 of the main power supply control unit 1501.

The table information transmission unit 1503 includes the storage unit 306, the transmission unit 307, the detection unit 1304, and an update unit 1504. The following describes only the update unit 1504 since the other units are similar to the corresponding units of the table information transmission unit 1303.

Instead of updating the main power supply cut-off count in the power information like the update unit 1305 of modification 2, the update unit 1504 updates the main power supply cut-off time in the power information.

Specifically, upon judging that the power supply has been cut off due to the main power switch being turned off, that is to say, in a case of the flag information 1302 changing from the cut-off state to the supply state while the detection signal is not being received from the detection unit 1304, the update unit 1504 acquires the main power supply cut-off time measured by the clock unit 1502, and adds the acquired main power supply cut-off time to the power information stored in the storage unit 306. Note that the main power supply cut-off time in the power information has an initial value of "0", and is preset by the manufacturer etc. of the processing device 1500.

Data

The following describes the power supply attribute table used by the instructing device 200 of modification 3.

FIG. 16 shows a data structure and exemplary content of a power supply attribute table 1600.

As shown in FIG. 16, the power supply attribute table 1600 stored in the storage unit 202 of the instructing device 200 of modification 3 includes a device name 501, an AC power supply cut-off count 1401, and a main power supply cut-off time 1601 in correspondence with each other for each processing device. A description of the device names 501 and AC power supply cut-off counts 1401 has been omitted since they are the same as the device names 501 and AC power supply cut-off counts 1401 of the power supply attribute table 1400 shown in FIG. 14.

The main power supply cut-off time 1601 indicates the time for which the power supply to the execution unit 303 of the corresponding processing device has been cut off due to the main power switch being turned off. The power information stored by the storage unit 306 of each processing device corresponds to the AC power supply cut-off count 1401 and main power supply cut-off time 1601.

Taking one example from FIG. 16, the processing device whose device name is "DEVICE A" has an AC power supply cut-off count of "0" and a main power supply cut-off time of "1000 HOURS", that is to say, the power supply to the execution unit 303 has been cut off for "1000 HOURS" due to the main power switch being turned off.

A relatively stable power supply can be expected if the processing device that has the lowest AC power supply cut-off count 1401 and the longest main power supply cut-off time, as in the processing device whose device name is "DEVICE A", is selected to be the cooperating device, thereby lowering the possibility of an interruption in cooperative processing due to the power supply to the cooperating device that is executing the cooperative function being cut off. Furthermore, since the selected processing device has not been used by the user for a relatively long time, cooperative processing is performed efficiently by utilizing the surplus processing capacity of the selected processing device.

Note that a description of updating of the power supply attribute table 1600 has been omitted due to being similar to the updating of the power supply attribute table 1400.

Modification 4

Overview

In embodiment 2, the power supply attribute table 1100 includes the cut-off count 1101 that indicates the number of times that the power supply has been cut off, regardless of whether the processing device 1000 is executing a cooperative function.

The following describes a modification in which the cut-off count 1101 of the power supply attribute table 1100 has been replaced with a count indicating the number of times that the power supply has been cut off during the execution of a cooperative function (hereinafter, called the "mid-execution cut-off count"). The following description focuses on differences from embodiment 2. Note that the instructing device 200 of modification 4 is the same as the instructing device 200 of embodiment 2, with the exception of the content of the power supply attribute table.

Processing Device Structure

First is a description of the functional structure of a processing device 1700 of modification 4.

Figure 17:
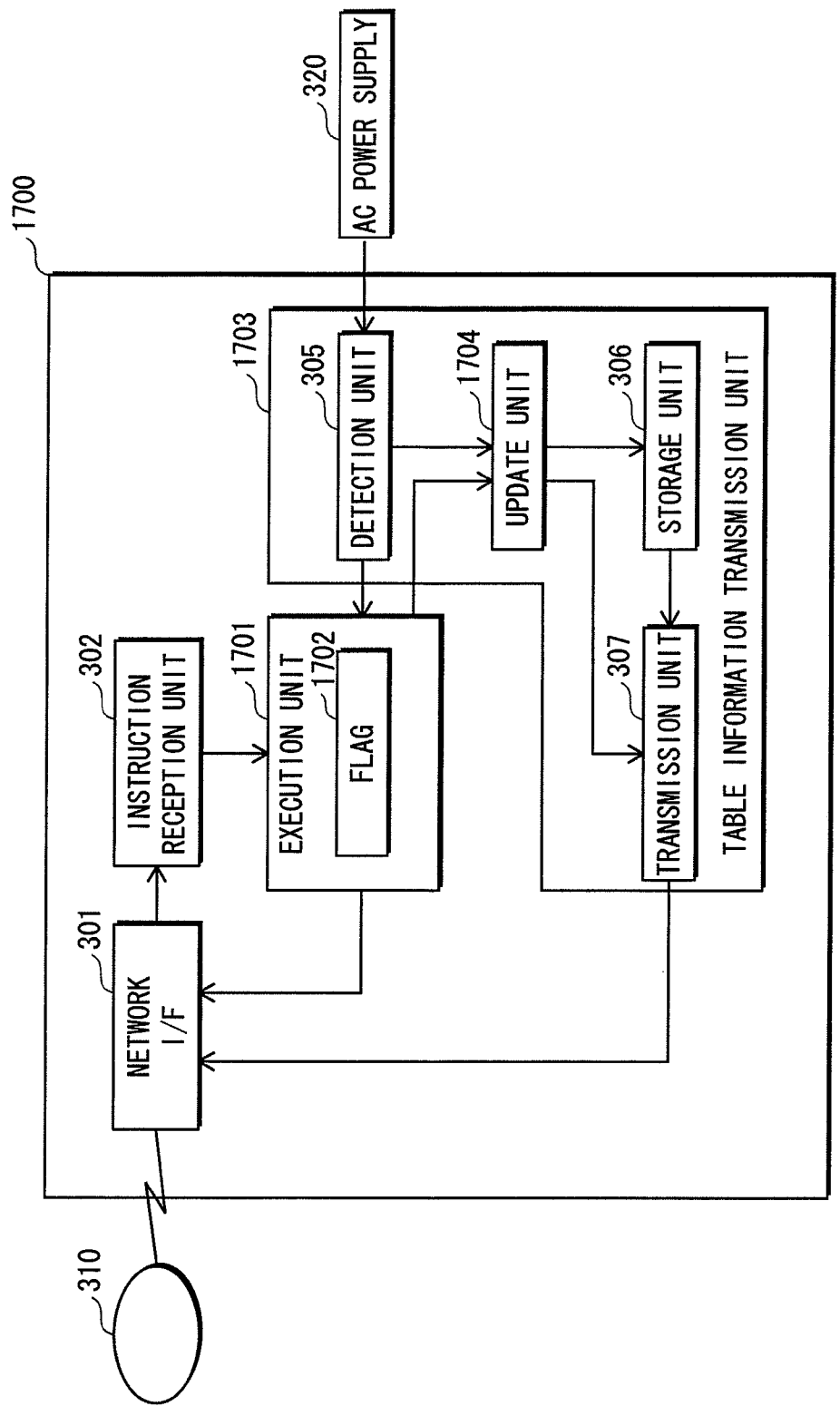
FIG. 17 shows a functional structure of a processing device 1700.

FIG. 17 shows a functional structure of the processing device 1700.

As shown in FIG. 17, the processing device 1700 includes the network interface 301, the instruction reception unit 302, an execution unit 1701, and a table information transmission unit 1703. The following describes only the execution unit 1701 and table information transmission unit 1703 since the other units are similar to the corresponding units in the processing device 1000 of embodiment 2.

Note that although not depicted in FIG. 17, the processing device 1700 includes a CPU. The functions of the execution unit 1701 and table information transmission unit 1703 are realized by causing the CPU to execute programs stored in the storage unit 306.

The execution unit 1701 performs the functions of the execution unit 303 of embodiment 2, and additionally identifies whether a cooperative function is being executed.

Specifically, the execution unit 1701 stores flag information 1702 identifying whether a cooperative function is being executed. When a cooperative function begins to be executed, the execution unit 1701 updates the flag information 1702 to indicate a state in which a cooperative function is being executed (hereinafter, called the "executing state"). When the execution of the cooperative function has been completed, the execution unit 1701 updates the flag information 1702 to indicate a state in which a cooperative function is not being executed (hereinafter, called the "non-executing state"). Note that the flag information 1702 is stored in a non-volatile RAM included in the execution unit 1701.

The table information transmission unit 1703 performs the functions of the table information transmission unit 1001 of embodiment 2, and additionally updates the power information stored in the storage unit 306 in accordance with the state of the execution unit 1701 indicated by the flag information 1702.

Specifically, the table information transmission unit 1703 includes the detection unit 305, the storage unit 306, the transmission unit 307, and an update unit 1704. The following describes only the update unit 1704 since the other units are similar to the corresponding units of the table information transmission unit 1001.

Each time a detection signal is received from the detection unit 305 while the flag information 1702 of the execution unit 1701 indicates the executing state, the update unit 1704 increments the power information which is the mid-execution cut-off count stored in the storage unit 306 by one. Note that upon incrementing the power information which is the mid-execution cut-off count by one, the update unit 1704 updates the flag information 1702 pertaining to the execution unit 1701 to indicate the non-executing state. Also, the power information has an initial value of "0", and is preset by the manufacturer etc. of the processing device 1700.

Data

The following describes the power supply attribute table used by the instructing device 200 of modification 4.

FIG. 18 shows a data structure and exemplary content of a power supply attribute table 1800.

As shown in FIG. 18, the power supply attribute table 1800 stored in the storage unit 202 of the instructing device 200 of modification 4 includes a device name 501 and a mid-execution cut-off count 1801 in correspondence with each other for each processing device. A description of the device names

501 has been omitted since they are the same as the device names 501 of the power supply attribute table 1100 shown in FIG. 11.

The mid-execution cut-off count 1801 indicates the number of times that the power supply from the AC power supply 320 has been cut off while the execution unit 303 of the corresponding processing device is executing a cooperative function. The power information stored by the storage unit 306 of each processing device corresponds to the mid-execution cut-off count 1801.

Taking one example from FIG. 18, the processing device whose device name is "DEVICE A" has a mid-execution cut-off count of "0".

By selecting the processing device that has the lowest mid-execution cut-off count 1801 to be the cooperating device, a relatively stable power supply can be expected during the execution of a cooperative function, thereby lowering the possibility of an interruption in cooperative processing due to the power supply to the cooperating device that is executing the cooperative function being cut off.

Note that a description of updating of the power supply attribute table 1800 has been omitted due to being similar to the updating of the power supply attribute table 1400.

Modification 5

Overview

The following describes modification 5 in which the cut-off count 1101 of the power supply attribute table 1100 of embodiment 2 has been replaced with an average operation time per day and a most-operational time period indicating a time period in which an operation count is high, with respect to a predetermined duration (e.g., the previous 7 days) in each processing device. The following description focuses on differences from embodiment 2. Note that the instructing device 200 of modification 5 is the same as the instructing device 200 of embodiment 2, with the exception of the content of the power supply attribute table.

Processing Device Structure

First is a description of the functional structure of a processing device 1900 of modification 5.

Figure 19:
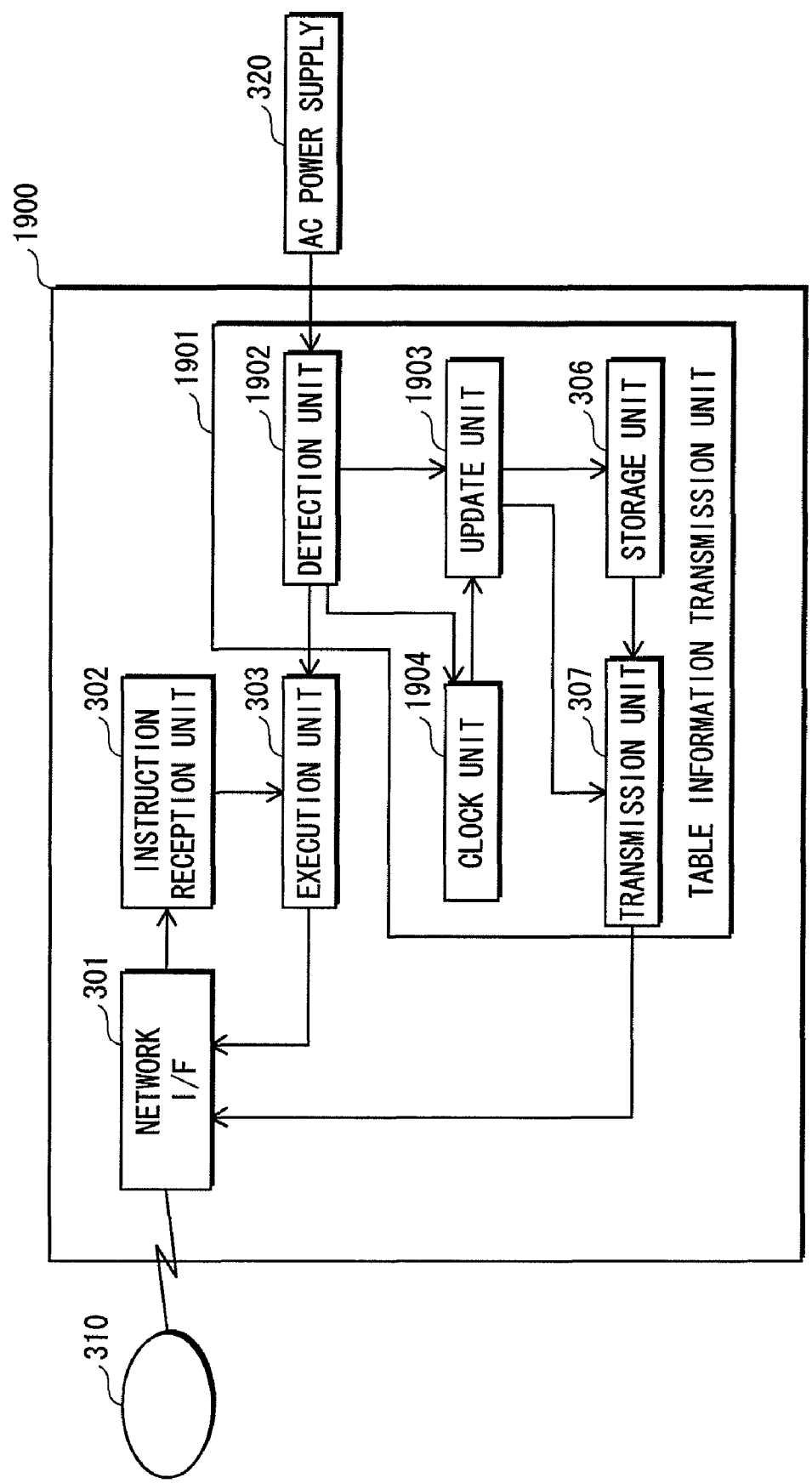
FIG. 19 shows a functional structure of a processing device 1900.

FIG. 19 shows a functional structure of the processing device 1900.

As shown in FIG. 19, the processing device 1900 includes the network interface 301, the instruction reception unit 302, the execution unit 303, and a table information transmission unit 1901. The following describes only the table information transmission unit 1901 since the other units are similar to the corresponding units in the processing device 1000 of embodiment 2.

Note that although not depicted in FIG. 19, the processing device 1900 includes a CPU. The functions of the table information transmission unit 1901 are realized by causing the CPU to execute a program stored in the storage unit 306.

The table information transmission unit 1901 performs the functions of the table information transmission unit 1001 of embodiment 2, and additionally updates the power information stored in the storage unit 306. The power information includes an average operation time per day and a most-operational time period indicating a time period in which the operation count is high, with respect to a predetermined period (e.g., the previous 7 days) in the processing device 1900. The table information transmission unit 1901 updates the power information based on times when the power supply to the execution unit 303 was started (hereinafter, called the "start times") and times when the power supply to the execution unit 303 was cut off (hereinafter, called the "end times").

Specifically, the table information transmission unit 1901 includes the storage unit 306, the transmission unit 307, a detection unit 1902, an update unit 1903, and a clock unit 1904. The following describes only the detection unit 1902, update unit 1903, and clock unit 1904 since the other units are similar to the corresponding units of the table information transmission unit 1001. Note that even if the power supply from the AC power supply 320 is cut off, the detection unit 1902, update unit 1903, and clock unit 1904 receive a power supply from an internal battery (not depicted) included in the processing device 1900.

The detection unit 1902 detects changes in the state of the power supply from the AC power supply 320 to the execution unit 303. Specifically, the detection unit 1902 detects that the power supply to the execution unit 303 has started and that the power supply to the execution unit 303 has been cut off, and sends a detection signal to the clock unit 1904 each time either of the above is detected. When the start of the power supply to the execution unit 303 has been detected, the detection unit 1902 also sends the detection signal to the update unit 1903.

Each time the detection signal is received from the detection unit 1902, the clock unit 1904 stores the date and time of the detection, that is to say, stores start times and end times.

Each time the detection signal is received from the detection unit 1902, that is to say, each time the detection unit 1902 detects that the power supply to the execution unit 303 has started, the update unit 1903 calculates the operation time length and operation time period pertaining to when the processing device 1900 previously operated, based on the start time and end time of the previous operation instance stored in the clock unit 1904. The update unit 1903 then causes the calculated operation time length and operation time period to be reflected in the later-described operation history information stored in the storage unit 306. Also, the update unit 1903 updates the average operation time and most-operational time period in the power information stored in the storage unit 306, based on the operation history information. Furthermore, the average operation time and most-operational time period in the power information have an initial value of "0", and are preset by the manufacturer etc. of the processing device 1900.

Data

The following describes the data used by the processing device 1900.

FIG. 20 shows a data structure and exemplary content of operation history information 2000.

As shown in FIG. 20, the operation history information 2000 stored in the storage unit 306 of the processing device 1900 stores a date 2001, an operation time length 2002, and a time-period operation history 2003 in correspondence with each other for each operation history of the processing device 1900.

The date 2001 is information indicating the date of a corresponding operation history. The operation time length 2002 is information indicating a total operation time of the processing device 1900 on a corresponding date. The time-period operation history 2003 is information indicating an operation state in each of 1-hour time periods on a corresponding date. A value of "1" recorded in a time period in the time-period operation history 2003 indicates that the processing device 1900 was operating in that time period.

Taking one example from FIG. 20, the operation time length of the processing device 1900 on the date "May 1, 2007" is "3 hours 57 minutes", and the time-period operation history shows that the processing device 1900 operated during the time periods "0:00-1:00", "11:00-12:00", and "12:00-13:00".

The following describes the updating of the operation history information 2000.

Each time the detection signal is received from the detection unit 1902, the update unit 1903 of the processing device 1900 calculates the operation time length and operation time period pertaining to when the processing device 1900 previously operated, based on the start time and end time of the previous operation instance stored in the clock unit 1904. The update unit 1903 then causes the calculated operation time length and operation time period to be reflected in the operation time length 2002 and time-period operation history 2003 pertaining to the corresponding date.

Specifically, if the operation history information 2000 does not have a record including a date 2001 indicating the date corresponding to the calculated operation time length and operation time period, the update unit 1903 adds a record including the date and calculated operation time length and operation time. However, if such a record is already included in the operation history information 2000, the update unit 1903 adds the calculated operation time length to the operation time length 2002 recorded in the record, and records a value of "1" in the time period of the time-period operation history 2003 that corresponds to the calculated time period.

The following describes the updating of the power information stored in the storage unit 306.

Each time the operation history information 200 is updated, the update unit 1903 of the processing device 1900 calculates an average operation time using the data from the operation time lengths 2002 pertaining to the predetermined duration (e.g., the previous 7 days), and updates the average operation time in the power information stored in the storage unit 306 with the calculated average operation time. Also, the update unit 1903 calculates a total operation count for each time period based on the data from the time-period operation histories 2003 pertaining to the predetermined duration, and updates the most-operational time period in the power information with the time periods in which the operation count is greater than or equal to a predetermined value (e.g., "3").

The following describes the power supply attribute table used by the instructing device 200 of modification 5.

FIG. 21 shows a data structure and exemplary content of a power supply attribute table 2100.

As shown in FIG. 21, the power supply attribute table 2100 stored in the storage unit 202 of the instructing device 200 of modification 5 includes a device name 501, an average operation time 2101, and a most-operational time period 2102 in correspondence with each other for each processing device. A description of the device names 501 has been omitted since they are the same as the device names 501 of the power supply attribute table 1100 shown in FIG. 11.

The average operation time 2101 is information indicating an average operation time per day in a predetermined duration (e.g., the previous 7 days) in a corresponding processing device. The most-operational time period 2101 is information indicating a time period in which the total operation count in the predetermined period is greater than or equal to a predetermined value (e.g., "3"). The power information stored by the storage unit 306 of each processing device corresponds to the average operation time 2101 and most-operational time period 2102.

Taking one example from FIG. 21, the processing device whose device name is "DEVICE A" has an average operation time of "2 hours 13 minutes" per day in the predetermined period (e.g., the previous 7 days), and the most-operational time period of "DEVICE A" in the predetermined period is "11:00-13:00". Also, the processing device whose device name is "DEVICE B" has an average operation time of "1 hour 18 minutes" per day in the predetermined period, and the most-operational time period of "DEVICE B" in the predetermined period is "21:00-22:00". Also, the processing device whose device name is "DEVICE D" has an average operation time of "7 hours 24 minutes" per day in the predetermined period, and the most-operational time period of "DEVICE D" in the predetermined period is "10:00-17:00".

By selecting the processing device "DEVICE D", which has the longest average operation time 2101 and the widest most-operational time period 2102, to be the cooperating device, a relatively stable power supply can be expected during the execution of a cooperative function, thereby lowering the possibility of an interruption in cooperative processing. Even in the case of the processing device "DEVICE B" that has the shortest average operation time 2101, if the most-operational time period of the processing device "DEVICE B" most closely matches the time period in which the cooperative function is to be executed, selecting the processing device "DEVICE B" to be the cooperating device enables expecting a relatively stable power supply during the execution of the cooperative function, thereby lowering the possibility of an interruption in cooperative processing.

Note that a description of updating of the power supply attribute table 2100 has been omitted due to being similar to the updating of the power supply attribute table 1100.

Operations

The following describes operations of the processing device 1900 that has the above-described structure and uses the above-described data.

Figure 22:
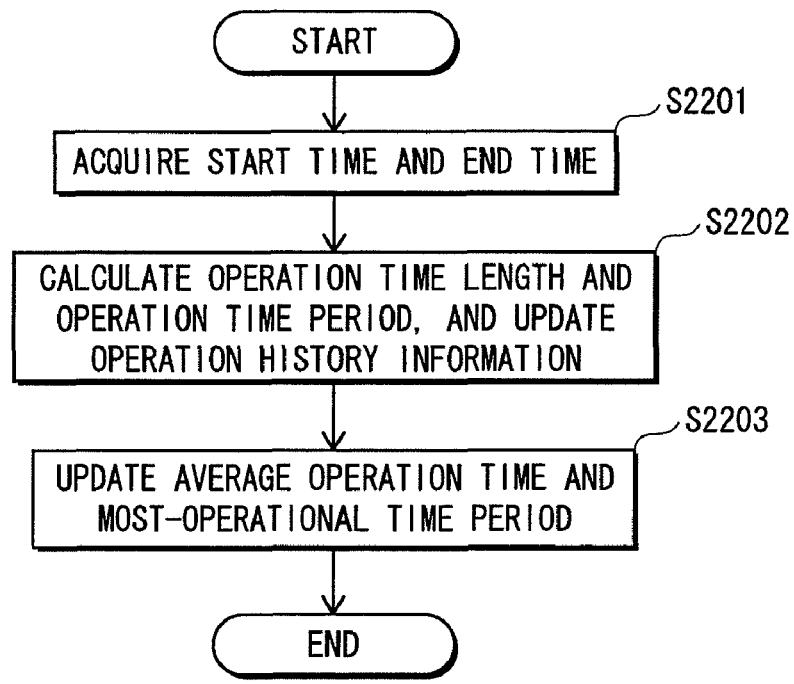
FIG. 22 is a flowchart showing update processing performed by an update unit 1903.

FIG. 22 is a flowchart showing update processing performed by the update unit 1903.

Upon receiving, the detection signal from the detection unit 1902 of the processing device 1900, the update unit 1903 of the processing device 1900 acquires the start time and end time of the previous operation instance stored in the clock unit 1904 of the processing device 1900 (step S2201).

The update unit 1903 calculates an operation time length and an operation time period based on the acquired start time and end time of the previous operation instance, causes the calculated operation time length to be reflected in the operation time length 2002 of the operation history information 2000 stored in the storage unit 306, and causes the calculated operation time period to be reflected in the time-period operation history 2003 of the operation history information 2000 (step S2202).

The update unit 1903 calculates an average operation time based on the data from the operation time lengths 2002 in the predetermined period (e.g., the previous 7 days) in the operation history information 2000, updates the average operation time in the power information with the calculated average operation time, calculates a time period in which the operation count is greater than or equal to the predetermined count (e.g., "3") based on the data from the time-period operation histories 2003 in the predetermined period, and updates the most-operational time period in the power information with the calculated time period (step S2203). The update unit 1903 then ends the update processing.

The following describes a concrete example of operations performed by the processing device 1900 using the exemplary content of the operation history information 2000 shown in FIG. 20, with reference to FIG. 22. Let us assume that the operation history information 2000 shown in FIG. 20 does not include a record for the date 2001 "May 7, 2007", and that the clock unit 1904 of the processing device 1900 is storing a start time "May 7, 2008, 10:58" and an end time "May 7, 2007, 12:08" for the previous operation instance.

Also, let us assume that the predetermined period is the seven days of "May 1, 2007-May 7, 2007", and that the predetermined value is "3".

Upon receiving the detection signal from the detection unit 1902 of the processing device 1900, the update unit 1903 of the processing device 1900 acquires the start time (May 7, 2007, 10:58) and end time (May 7, 2007 12:08) of the previous operation instance stored in the clock unit 1904 of the processing device 1900 (step S2201).

The update unit 1903 calculates an operation time length (1 hour 10 minutes) and an operation time period (11:00-12:00) based on the acquired start time and end time of the previous operation instance, and causes the calculated operation time length and operation time period to be reflected in the operation history information 2000 stored in the storage unit 306 (step S2202). Specifically, since the operation history information 2000 does not have a record including a date 2001 that matches the date (May 7, 2007) corresponding to the calculated operation time length and operation time period, the update unit 1903 adds a date 2001 of "May 7, 2007", an operation time length 2002 of "1 hour 10 minutes", and a time-period operation history 2003 of "11:00-12:00", that is to say, records a value of "1" in the 11:00-12:00 time period.

The update unit 1903 calculates an average operation time (2 hours 13 minutes) based on the data from the operation time lengths 2002 in the predetermined period (May 1, 2007-May 7, 2007) in the operation history information 2000, updates the average operation time in the power information with the calculated average operation time, calculates time periods (11:00-12:00 and 12:00-13:00, that is to say, 11:00-13:00) in which the operation count is greater than or equal to the predetermined count ("3") based on the data from the time-period operation histories 2003 in the predetermined period (May 1, 2007-May 7, 2007), and updates the most-operational time period in the power information with the calculated most-operational time period (step S2203). The update unit 1903 then ends the update processing.

Embodiment 3

Overview

In embodiment 1, the instructing device 200 selects a cooperating device from among processing devices based on tables stored in the storage unit 202.

An information processing system of embodiment 3 includes a selection server, and a cooperating device is selected from among processing devices based on tables stored in the selection server. The following description focuses on differences from embodiment 1.

Information Processing System Structure

First is a description of the structure of the information processing system of embodiment 3.

Figure 23:
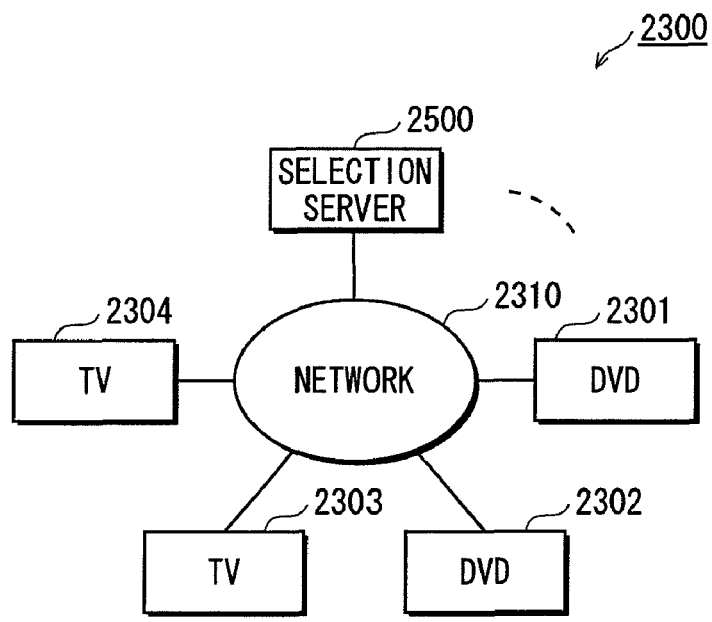
FIG. 23 shows a system structure of an information processing system 2300 according to embodiment 3.

FIG. 23 shows a system structure of an information processing system 2300 of embodiment 3.

As shown in FIG. 23, the information processing system 2300 includes a DVD/HDD recorder 2301, a DVD/HDD recorder 2302, a TV receiver 2303, a TV receiver 2304, and a selection server 2500, all of which are connected via a network 2310.

The DVD/HDD recorders and TV receivers can be instructing devices and cooperating devices, and may be installed in the same household or different locations. Also, the network 2310 is a network that corresponds to the home network 112, communication line 113, wide area network 114, communication line 115, and home network 119, as shown in FIG. 1, in the information processing system 100 of embodiment 1.

Instructing Device Structure

The following describes the functional structure of the instructing device of embodiment 3.

Figure 24:
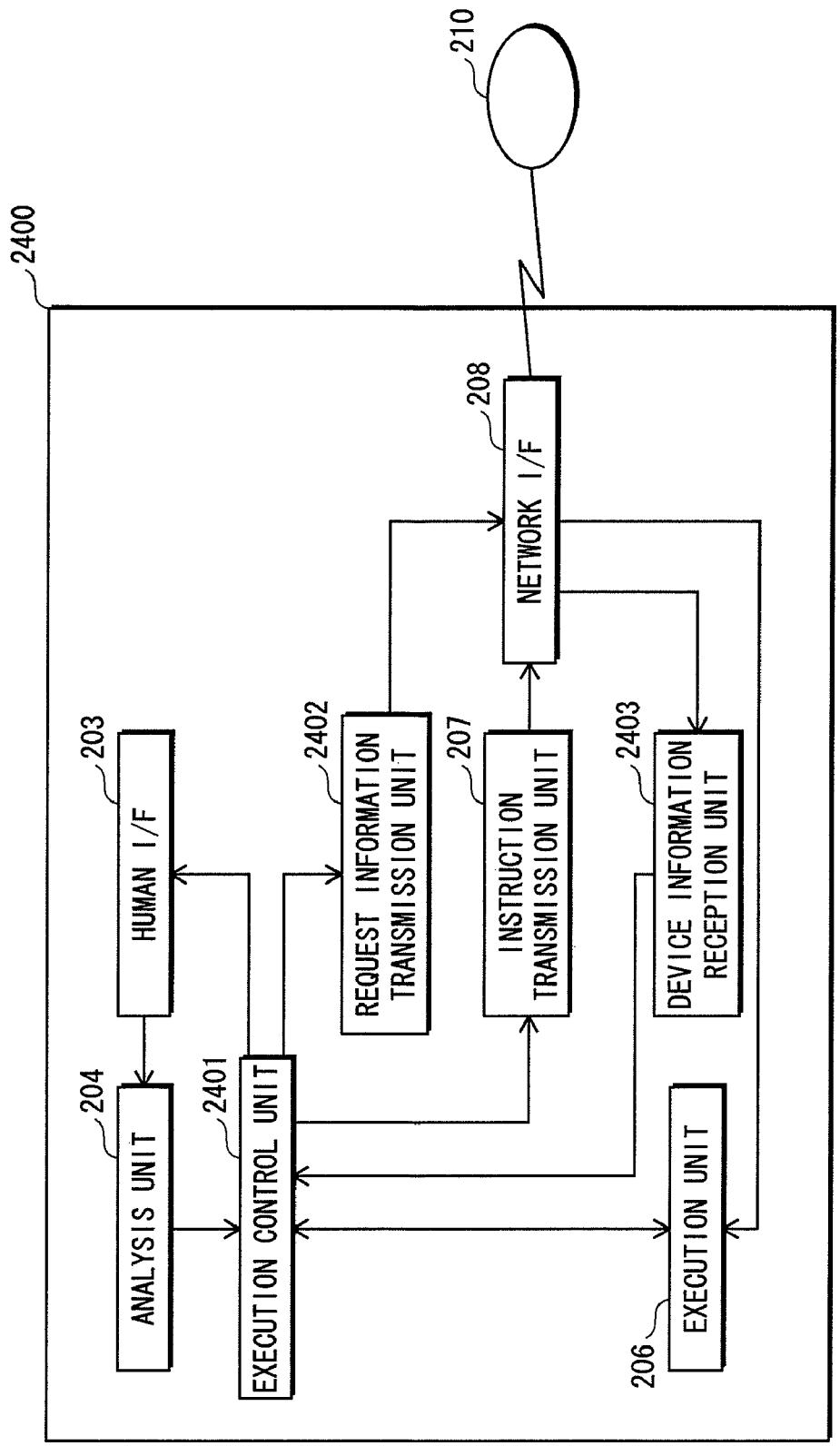
FIG. 24 shows a functional structure of an instructing device 2400.

FIG. 24 shows a functional structure of an instructing device 2400.

As shown in FIG. 24, the instructing device 2400 includes the human interface 203, the analysis unit 204, the execution unit 206, the instruction transmission unit 207, the network interface 208, an execution control unit 2401, a request information transmission unit 2402, and a device information reception unit 2403.

The following describes only the execution control unit 2401, the request information transmission unit 2402, and the device information reception unit 2403 since the other units are similar to the corresponding units in the instructing device 200 of embodiment 1.

Note that although not depicted in FIG. 24, the instructing device 2400 includes a CPU. The functions of the execution control unit 2401, the request information transmission unit 2402, and the device information reception unit 2403 are realized by causing the CPU to execute programs stored in a memory.

The execution control unit 2401 has basically the same functions as the execution control unit 205 of embodiment 1, with the exception that the execution control unit 2401 does not select the cooperating device when cooperation with another processing device has been judged to be necessary.

Specifically, when cooperation with another processing device has been judged to be necessary, the execution control unit 2401 transmits cooperative function information indicating a cooperative function to the request information transmission unit 2402, in order to cause the selection server 2500 to select a cooperating device.

The request information transmission unit 2402 generates request information that requests the selection of a cooperating device and includes the cooperative function information received from the execution control unit 2401. The request information transmission unit 2402 transmits the generated request information to the selection server 2500 via the network interface 208.

The device information reception unit 2403 receives, from the selection server 2500, a device name identifying a cooperating device selected by the selection server 2500 and information indicating an address, such as an IP address, of the selected cooperating device, and transfers the received device name and information indicating the address, such as an IP address, to the execution control unit 2401.

Selection Server Structure

The following describes the functional structure of the selection server.

Figure 25:
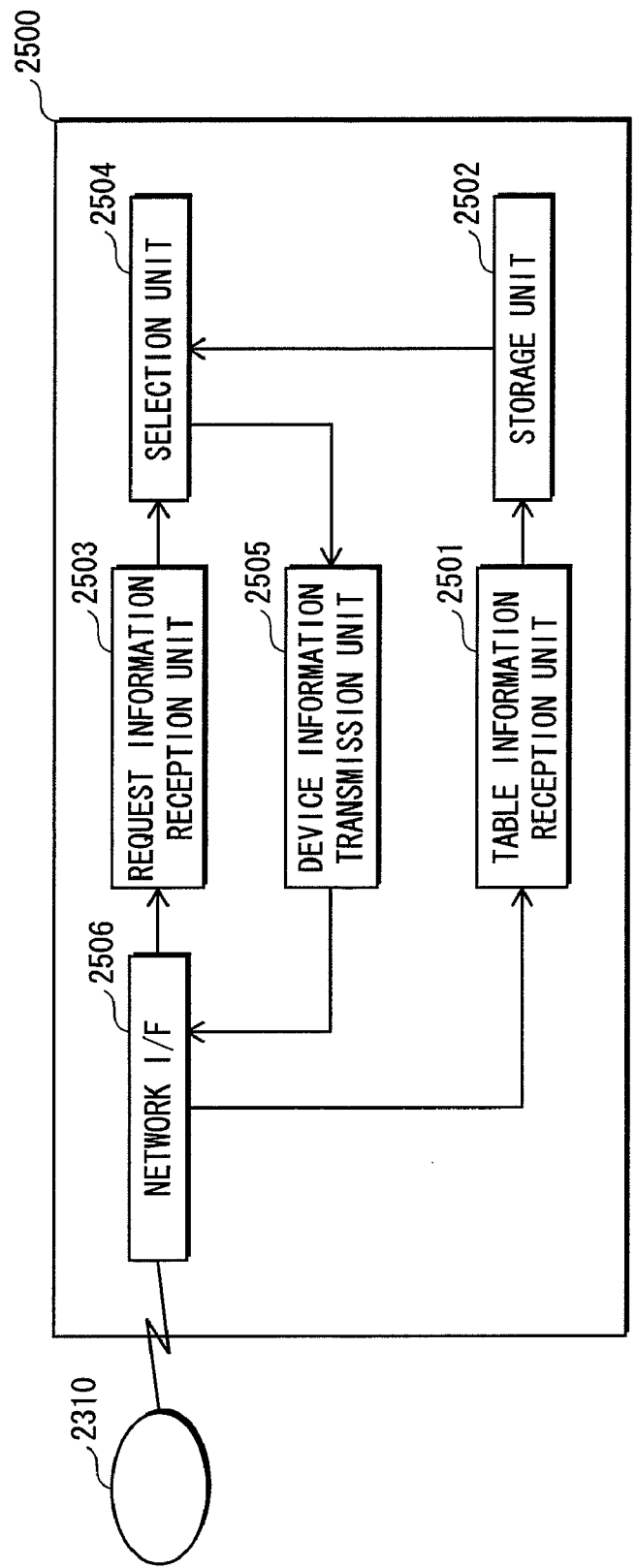
FIG. 25 shows a system structure of a selection server 2500.

FIG. 25 shows a system structure of the selection server 2500.

As shown in FIG. 25, the selection server 2500 includes a table information reception unit 2501, a storage unit 2502, a request information reception unit 2503, a selection unit 2504, a device information transmission unit 2505, and a network interface 2506.

Note that although not depicted in FIG. 25, the selection server 2500 includes a CPU. The functions of the table information reception unit 2501, request information reception unit 2503, selection unit 2504, and device information transmission unit 2505 are realized by causing the CPU to execute programs stored in the storage unit 2502. Note that the power information reception unit of the present invention corresponds to the table information reception unit 2501.

Similarly to the table information reception unit 201 of the instructing device 200 in embodiment 1, the table information reception unit 2501 receives a device name, device information, and power information from each processing device via the network interface 2506, and causes the received device names, device information, and power information to be reflected in the provided function table 400 and power supply attribute table 500 stored in the storage unit 2502.

The storage unit 2502 is a nonvolatile RAM. Similarly to the store unit 202 of the instructing device 200 in embodiment 1, the storage unit 2502 stores the provided function table 400, the power supply attribute table 500, and the criteria information table 600.

The request information reception unit 2503 receives request information from the instructing device 2400 via the network interface 2506, and transfers the received request information to the selection unit 2504.

The selection unit 2504 receives the request information from the request information reception unit 2503, and based on the cooperative function information included in the received request information, selects, as the cooperating device, a processing device that the instructing device 2400 will cause to execute a cooperative function. The selection unit 2504 then transmits a device name identifying the selected cooperating device to the device information transmission unit 2505. Note that a description of the selection of the cooperating device has been omitted since, similarly to the execution control unit 205 of the instructing device 200 in embodiment 1, the selection of the cooperating device is performed based on the provided function table 400, power supply attribute table 500, and criteria information table 600 stored in the storage unit 2502.

The device information transmission unit 2505 receives the device name of the cooperating device from the selection unit 2504, and transmits the device name and information indicating an address, such as an IP address, of the cooperating device to the instructing device 2400 via the network interface 2506. Note that similarly to the instruction transmission unit 207 of the instructing device 200 in embodiment 1, the information indicating the address, such as an IP address, of the cooperating device may be preset by the user etc., and indicate a device name and an address, such as an IP address, in correspondence with each other for each processing device, or may be information such as IP addresses etc. indicating the transmission sources when the device names etc. are received from the processing devices.

The network interface 2506 is an NIC that connects with the network 2310.

Data

A description of the provided function table 400, power supply attribute table 500, and criteria information table 600 stored in the storage unit 2502 of the selection server 2500 has been omitted since they are similar to the corresponding tables stored by the storage unit 202 of the instructing device 200 in embodiment 1. Note that the destination information stored by the storage unit 306 of the processing device 300 includes information indicating an address, such as an IP address, of the selection server.

Operations

Instructing Device Operations

The following describes operations performed by the instructing device 2400.

Figure 26:
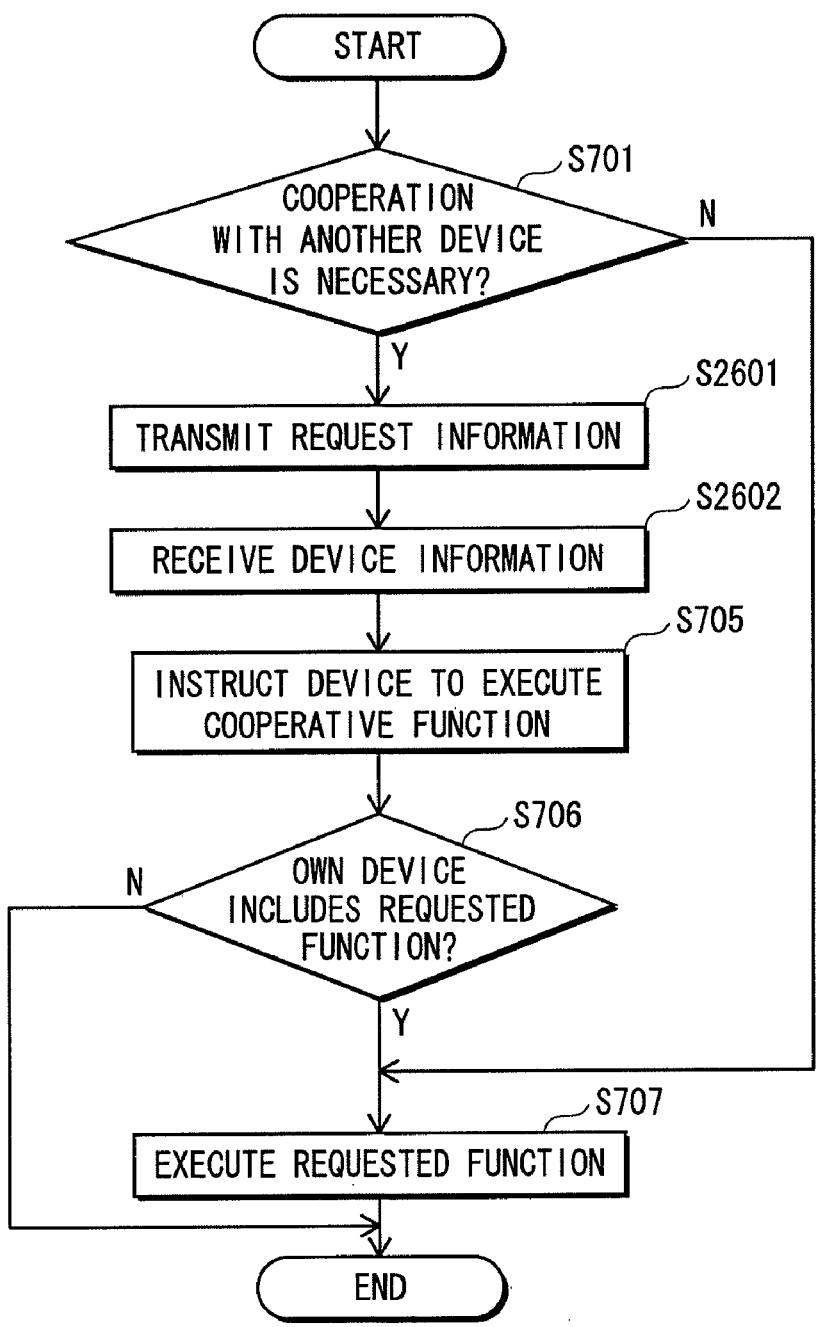
FIG. 26 is a flowchart showing processing performed by the instructing device 2400 to transmit instruction data to a cooperating device.

FIG. 26 is a flowchart showing processing performed by the instructing device 2400 to transmit instruction data to a cooperating device. The processing shown in FIG. 26 is the same as the processing shown in FIG. 7 that is performed by the instructing device 200 of embodiment 1, with the exception that steps S702 to S704 have been replaced with steps S2601 and S2602. The following describes the processing of steps S2601 and S2602.

If cooperation with another processing device is judged to be necessary in step S701 (step S701:Y), the selection server 2500 is caused to select a cooperating device by the following processing. The execution control unit 2401 transmits cooperative function information indicating a cooperative function to the request information transmission unit 2402. The request information transmission unit 2402 generates request information that requests the selection of a cooperating device and includes the received cooperative function information, and transmits the generated request information to the selection server 2500 via the network interface 208 (step S2601).

The device information reception unit 2403 receives a device name and information indicating an address such as an IP address from the selection server 2500 (step S2602), and transfers the received device name and information indicating an address such as an IP address to the execution control unit 2401. The execution control unit 2401 transmits the received device name, information indicating an address such as an IP address, and cooperative function information to the instruction transmission unit 207, and thereafter ends processing.

Selection Server Operations

The following describes operations performed by the selection server 2500.

Figure 27:
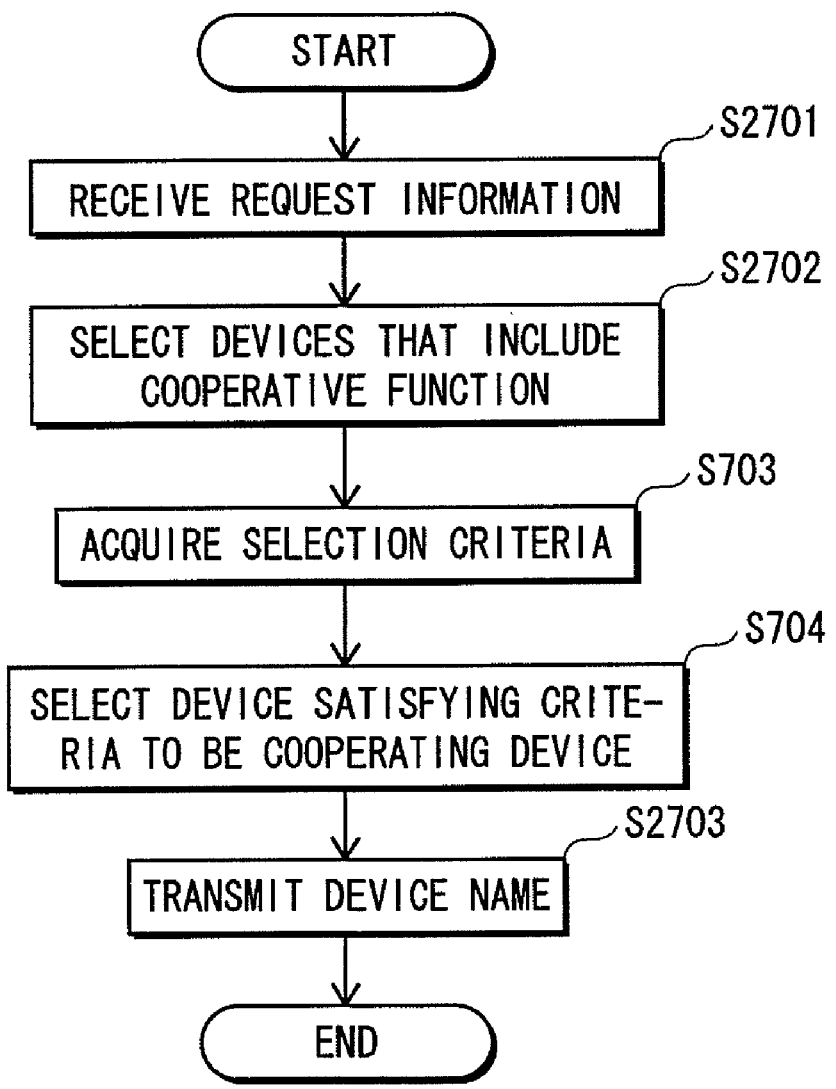
FIG. 27 is a flowchart showing processing performed by the selection server 2500 to select a cooperating device.

FIG. 27 is a flowchart showing operations performed by the selection server 2500 to select a cooperating device.

The request information reception unit 2503 of the selection server 2500 receives request information from the instructing device 2400 (step S2701), and transfers the received request information to the selection unit 2504. The selection unit 2504 receives the request information, and based on the provided function table 400 stored in the storage unit 2502, selects processing devices that include the cooperative function indicated by the cooperative function information included in the received request information (step S2702).

Similarly to the processing of the instructing device 200 in embodiment 1, the selection unit 2504 acquires an unpluggability criteria and an estimated probability criteria for the processing device that is to execute the cooperative function (step S703), selects a cooperating device (step S704), and transmits a device name identifying the selected cooperating device to the device information transmission unit 2505.

The device information transmission unit 2505 receives the device name of the cooperating device, and transmits the received device name and information indicating an address, such as an IP address, of the cooperating device to the instructing device 2400 (step S2703), and thereafter ends processing.

Supplementary Remarks

Although described above based on the embodiments, an information processing system of the present invention is of course not limited to such embodiments. Variations such as the following are also possible.

(1) Although the execution of authentication processing when the instructing device and cooperating device are to perform cooperative processing is not particularly described in the above embodiments and modifications, general authentication processing may be executed between the instructing device and cooperating device.

(2) Although the provided function table and power supply attribute table are separate tables in the above embodiments and modifications, the provided function table and power supply attribute table may be integrated in a single table.

Specifically, taking the example of embodiment 1, a device name, provided function, unpluggability, and estimated unplugged probability may be stored in a single table in correspondence with each other for each processing device.

(3) Although the various devices are interconnected via a wired network in the above embodiments and modifications, a wireless network or power line network may be used. The same follows for the network 2310 of embodiment 3.

Note that in the case of a power line network, both network connections and power supply to the devices and selection server are performed via power cables, and therefore the power cable also functions as the network interface in the instructive device, processing devices, and selection server.

(4) In the above embodiments and modifications, a home network may be a plurality of network groups connected by a router, bridge, or the like. Although the home network in the information system of embodiment 1 is a network installed in a household, the home network is not limited to being installed in a household. The home network may be installed in a location such as an office.

(5) In the above embodiments and modifications, programs are stored in the storage unit 202 of the instructing device, and part of the functions of the instructing device are realized by the CPU executing the programs. However, the instructing device may include a memory that is separate from the storage unit 202, and the programs may be stored in the memory. The same follows for the programs stored in the storage unit 306 of the processing device in the above embodiments and modifications.

(6) In the above embodiments and modifications, the instructing device stores a provided function table indicating the functions included in the various devices. However, if the various devices include the same functions, a provided performance table that indicates device performance such as the CPU processing capability of each device may be stored instead of the provided function table. For example, if the instructing device needs to perform cooperative processing with a processing device that includes two or more CPUs, the instructing device may reference the provided performance table and select, as cooperating device candidates, cooperating devices that include two or more CPUs.

(7) In the above embodiments and modifications, the instructing device performs cooperative processing with one processing device. However, in the exemplary case of a plurality of cooperative functions to be executed, cooperative processing may be performed with a plurality of processing devices. Even in the case of one cooperative function, conventional technology may be used to divide the cooperative function among a plurality of processing devices.

(8) Although the description in the above embodiments and modifications focuses on a case of the power supply to the processing device being cut off during the execution of cooperative processing, an interruption in cooperative processing may similarly occur if the network connection is cut off during the execution of cooperative processing. In view of this, a variation such as the following is also possible.

Specifically, instead of the power information, the processing devices may store connection history information indicating a network connection history, the processing devices may transmit the connection history information to the instructing device, and the instructing device may select a cooperating device based on the connection history information received from the processing devices.

(9) The instructing device of embodiment 1 and modification 1 selects a cooperating device with use of the criteria information table 600. However, in the example of embodiment 1, a cooperating device can be selected without using the criteria information table 600, by selecting a processing device whose unpluggability is "NO" to be the cooperating device, regardless of the function that is to be executed by the processing device.

(10) In the description of the operations performed by the instructing device 200 of embodiment 1, H.264 format video data transmitted by the processing device 300 is received by the execution unit 206 of the instructing device 200. However, the processing device 300 may encrypt the video data before transmission or convert (transcode) the video from H.264 format to MPEG2 format before transmission.

(11) In the description of operations performed by the instructing device 200 of embodiment 1, the reception of a processing request from a user is used as the trigger for selecting a cooperating device. However, if the processing corresponding to the processing request from the user is processing whose execution is to be started at a predetermined time, such as scheduled recording to be performed by a DVD/HDD recorder, the arrival of the predetermined time may be used as the trigger for selecting a cooperating device.

(12) Although items in the power supply attribute table are simply increased in embodiment 2 and modifications 2 to 5, the items may be periodically (e.g., once a month) reset to their initial values. For example, the cut-off counts 1101 in the power supply attribute table 1100 of embodiment 2 may be reset once a month, thereby enabling the instructing device to select a cooperating device based on the recent cut-off count trend of the processing devices.

Also, the processing device 1000 of embodiment 2 may store a history of cut-off counts. Specifically, the processing device 100 may store a date and a cut-off count in correspondence with each other for each history, and store cut-off counts in a predetermined duration (e.g., the previous 30 or 31 days). This structure enables the instructing device to select a cooperating device based on a recent cut-off count trend in the processing devices. The same follows for the processing devices of modifications 2 to 4.

(13) In embodiments 1 and 2 and modifications 1 to 5, the instructing device selects a cooperating device based on a prestored provided function table and power supply attribute table. However, if the various devices are physically connected via a single LAN (a LAN in the same subnet), the instructing device does not need to prestore the provided function table and power supply attribute table. Specifically, upon judging that cooperation with another processing device is necessary, the instructing device broadcasts, via the LAN, request information that requests the transmission of power information. In response to the received request information, the processing devices connected to the LAN transmit their device names, device information, and power information. The instructing device selects a cooperating device based on the device information and power information received from the processing devices.

Also, the instructing device may include cooperative function information in the request information broadcasted via the LAN, and among the processing devices that are connected to the LAN and received the request information, only the processing devices that include the function indicated by the cooperative function information may transmit their device name, device information, and power information.

Note that once device names, device information, and power information have been received from the processing devices, the instructing device may generate a provided function table and power supply attribute table based on the received information, and thereafter select a cooperating device based on the generated tables. Also, after selecting a cooperating device, the instructing device may discard the received information and perform the processing of broadcasting request information and receiving information from the processing devices each time cooperation with another processing device becomes necessary.

(14) In embodiments 1 and 2 and modifications 1 to 5, the processing devices transmit their device name, device information, and power information in accordance with prestored information indicating an address such as an IP address. However, if the various devices are physically connected via a single LAN (a LAN in the same subnet), the processing devices may broadcast their device names, device information, and power information via the LAN.

(15) Although the selection server 2500 selects a cooperating device in embodiment 3, the selection server may generate a provided function table and power supply attribute table based on the device names, device information, and power information received from the processing devices, and transmit the generated tables to the instructing device. Thereafter, the instructing device may select a cooperating device based on the tables received from the selection server.

(16) In embodiment 1, the instructing device 200 selects a cooperating device based on the prestored criteria information table. However, the instructing device 200 may receive, in advance from a user, a criteria for selecting a processing device that is to execute a cooperative function, may be able to cause the received criteria to be reflected in the criteria information table, and may select a cooperating device based on the criteria information table include the criteria received from the user.

Also, the processing request received from the user may be able to specify a criteria for selecting a processing device that is to execute a function corresponding to the processing request received from the user, and the processing device may select a cooperating device based on the criteria specified in the processing request.

(17) Embodiment 1 describes the operations of the instructing device 200 using an exemplary case in which a DVD/HDD recorder (the instructing device 200) including a recording function and a playback function selects a processing device including an H.264 tuner function to be the cooperating device. However, the present invention is of course not limited to this example. Cooperative processing may be performed between all kinds of devices, examples of which include a TV receiver, an optical disk (e.g., DVD or BD) recorder or player, a hard disk recording device, a semiconductor memory recording device, an audio device, a refrigerator, an air conditioner, a front door intercom, a telephone, a surveillance camera, a lighting device, a video camera, a personal computer, a mobile phone, and an automobile.

For example, in order to prevent crime, a person away from home may wish to cause an appliance in his/her room to operate in order to make it appear as if the person were in his/her room. In this case, cooperative processing may be performed between a mobile phone in the possession of the person and a processing device such as a TV receiver, an audio device, or a lighting fixture installed in the person's room (i.e., the processing device may be put into an operating state).

Also, since each processing device includes a CPU and the functions of the execution unit 303 are realized by the CPU executing a program stored in the storage unit 306, the instructing unit may, for example, cause a processing device to perform a desired function by transmitting a program for realizing a function when transmitting instruction data. This structure enables the instructing device to select a cooperating device based on only the power supply attribute table, without giving consideration to the functions included in the processing device.

INDUSTRIAL APPLICABILITY

An information processing system of the present invention is applicable, in a case where a plurality of devices perform processing in cooperation, to selecting a device with which to cooperate.

The invention claimed is:
1. An information processing system comprising:
an instructing device that instructs execution of predetermined processing; and
a plurality of processing devices that are able to execute the predetermined processing, wherein the instructing device includes:
a power information reception unit operable to receive a plurality of power information pieces that are in one-to-one correspondence with the plurality of processing devices, each power information piece relating to power supply of the corresponding processing device and being stored by the corresponding processing device;
a selection unit operable to select, from among the processing devices, a processing device to be instructed to execute the predetermined processing, in accordance with the power information pieces received by the power information reception unit; and
an instruction transmission unit operable to transmit an instruction to execute the predetermined processing to the processing device selected by the selection unit, wherein each processing device includes:
an instruction reception unit operable to receive the instruction to execute the predetermined processing transmitted by the instructing device;
an execution unit operable to execute the predetermined processing if the instruction reception unit has received the instruction to execute the predetermined processing; and
a power information transmission unit operable to transmit the power information piece that relates to power supply to the own processing device,
wherein the power information transmission unit of each processing device includes:
a storage subunit storing therein the power information piece relating to the own processing device;
a detection subunit operable to detect a change in a state of power supply to the own processing device; and
an update subunit operable to, each time the detection subunit detects a change in the state of power supply, update the power information piece stored in the storage subunit so that a result of the detection is reflected in the power information piece,
wherein if the update unit has updated the power information piece, the power information transmission unit transmits the updated power information piece,
wherein each power information piece includes a cut-off count indicating the number of times that power supply to the own processing device has been cut off,
wherein the detection subunit of the power information transmission unit detects a start of power supply to the own processing device,
wherein the update subunit of the power information transmission unit increments the cut-off count by one each time the detection subunit performs the detection, and wherein the selection unit of the instructing device selects the processing device to be instructed to execute the predetermined processing, in accordance with the cut-off counts received by the power information reception unit of the instructing device.

2. An information processing system comprising:

an instructing device that instructs execution of predetermined processing; and a plurality of processing devices that are able to execute the predetermined processing, wherein the instructing device includes:

a power information reception unit operable to receive a plurality of power information pieces that are in one-to-one correspondence with the plurality of processing devices, each power information piece relating to power supply of the corresponding processing device and being stored by the corresponding processing device;

a selection unit operable to select, from among the processing devices, a processing device to be instructed to execute the predetermined processing, in accordance with the power information pieces received by the power information reception unit; and an instruction transmission unit operable to transmit an instruction to execute the predetermined processing to the processing device selected by the selection unit, wherein each processing device includes:

an instruction reception unit operable to receive the instruction to execute the predetermined processing transmitted by the instructing device;

an execution unit operable to execute the predetermined processing if the instruction reception unit has received the instruction to execute the predetermined processing; and a power information transmission unit operable to transmit the power information piece that relates to power supply to the own processing device, wherein the power information transmission unit of each processing device includes:

a storage subunit storing therein the power information piece relating to the own processing device;

a detection subunit operable to detect a change in a state of power supply to the own processing device; and an update subunit operable to, each time the detection subunit detects a change in the state of power supply, update the power information piece stored in the storage subunit so that a result of the detection is reflected in the power information piece, wherein if the update unit has updated the power information piece, the power information transmission unit transmits the updated power information piece, wherein each processing device further includes a main power supply control unit operable to (i) switch between a supply state of supplying power from an alternating current power supply to the execution unit and a cut-off state of cutting off power from the alternating current power supply to the execution unit, and (ii) identify one of the supply state and the cut-off state, wherein each power information piece includes an alternating current power supply cut-off count indicating the number of times that power supply from the alternating current power supply to the own processing device has been cut off, wherein the detection subunit of the power information transmission unit detects a start of power supply from the alternating current power supply to the own processing device, wherein the update subunit of the power information transmission unit increments the alternating current power supply cut-off count by one each time the detection subunit performs the detection while the main power supply control unit is identifying the supply state, and wherein the selection unit of the instructing device selects the processing device to be instructed to execute the predetermined processing, in accordance with the alternating current power supply cut-off counts received by the power information reception unit of the instructing device.

3. The information processing system of claim 2, wherein the main power supply control unit is further operable to measure a time during which the cut-off state is being identified, wherein each power information piece further includes a main power supply cut-off time indicating the time during which the main power supply control is identifying the cut-off state, wherein each time the main power supply control unit switches from the cut-off state to the supply state while the detection subunit has not performed the detection, the update subunit of the power information transmission unit adds, to the main power supply cut-off time, the time measured by the main power supply control unit, and wherein the selection unit of the instructing device selects the processing device to be instructed to execute the predetermined processing, further in accordance with the main power supply cut-off times received by the power information reception unit of the instructing device.

4. An information processing system comprising:

an instructing device that instructs execution of predetermined processing; and a plurality of processing devices that are able to execute the predetermined processing, wherein the instructing device includes:

a power information reception unit operable to receive a plurality of power information pieces that are in one-to-one correspondence with the plurality of processing devices, each power information piece relating to power supply of the corresponding processing device and being stored by the corresponding processing device;

a selection unit operable to select, from among the processing devices, a processing device to be instructed to execute the predetermined processing, in accordance with the power information pieces received by the power information reception unit; and an instruction transmission unit operable to transmit an instruction to execute the predetermined processing to the processing device selected by the selection unit, wherein each processing device includes:

an instruction reception unit operable to receive the instruction to execute the predetermined processing transmitted by the instructing device;

an execution unit operable to execute the predetermined processing if the instruction reception unit has received the instruction to execute the predetermined processing; and a power information transmission unit operable to transmit the power information piece that relates to power supply to the own processing device, wherein the power information transmission unit of each processing device includes:

a storage subunit storing therein the power information piece relating to the own processing device;

a detection subunit operable to detect a change in a state of power supply to the own processing device; and an update subunit operable to, each time the detection subunit detects a change in the state of power supply, update the power information piece stored in the storage subunit so that a result of the detection is reflected in the power information piece, wherein if the update unit has updated the power information piece, the power information transmission unit transmits the updated power information piece, wherein each processing device further includes a main power supply control unit operable to (i) switch between a supply state of supplying power from an alternating current power supply to the execution unit and a cut-off state of cutting off power from the alternating current power supply to the execution unit, and (ii) identify one of the supply state and the cut-off state, wherein each power information piece includes a main power supply cut-off count indicating the number of times that power supply has been cut off by the switching performed by the main power supply control unit, wherein the detection subunit of the power information transmission unit detects a start of power supply from the alternating current power supply to the own processing device, wherein each time the main power supply control unit switches from the cut-off state to the supply state while the detection subunit has not performed the detection, the update subunit of the power information transmission unit increments the main power supply cut-off count by one, and wherein the selection unit of the instructing device selects the processing device to be instructed to execute the predetermined processing, in accordance with the main power supply cut-off counts received by the power information reception unit of the instructing device.

5. An information processing system comprising:

an instructing device that instructs execution of predetermined processing; and a plurality of processing devices that are able to execute the predetermined processing, wherein the instructing device includes:

a power information reception unit operable to receive a plurality of power information pieces that are in one-to-one correspondence with the plurality of processing devices, each power information piece relating to power supply of the corresponding processing device and being stored by the corresponding processing device;

a selection unit operable to select, from among the processing devices, a processing device to be instructed to execute the predetermined processing, in accordance with the power information pieces received by the power information reception unit; and an instruction transmission unit operable to transmit an instruction to execute the predetermined processing to the processing device selected by the selection unit wherein each processing device includes:

an instruction reception unit operable to receive the instruction to execute the predetermined processing transmitted by the instructing device;

an execution unit operable to execute the predetermined processing if the instruction reception unit has received the instruction to execute the predetermined processing; and a power information transmission unit operable to transmit the power information piece that relates to power supply to the own processing device, wherein the power information transmission unit of each processing device includes:

a storage subunit storing therein the power information piece relating to the own processing device;

a detection subunit operable to detect a change in a state of power supply to the own processing device; and an update subunit operable to, each time the detection subunit detects a change in the state of power supply, update the power information piece stored in the storage subunit so that a result of the detection is reflected in the power information piece, wherein if the update unit has updated the power information piece, the power information transmission unit transmits the updated power information piece, wherein the execution unit of each processing device is further operable to identify whether the predetermined processing is being executed, wherein each power information piece includes a mid-execution cut-off count indicating the number of times that power supply to the own processing device has been cut off while the execution unit is executing the predetermined processing, wherein the detection subunit of the power information transmission unit detects a start of power supply to the own processing device, wherein the update subunit of the power information transmission unit increments the mid-execution cut-off count by one each time the detection subunit performs the detection while the execution unit is executing the predetermined processing, and wherein the selection unit of the instructing device selects the processing device to be instructed to execute the predetermined processing, in accordance with the mid-execution cut-off counts received by the power information reception unit of the instructing device.

6. An information processing system comprising:

an instructing device that instructs execution of predetermined processing; and a plurality of processing devices that are able to execute the predetermined processing, wherein the instructing device includes:

a power information reception unit operable to receive a plurality of power information pieces that are in one-to-one correspondence with the plurality of processing devices, each power information piece relating to power supply of the corresponding processing device and being stored by the corresponding processing device;

a selection unit operable to select, from among the processing devices, a processing device to be instructed to execute the predetermined processing, in accordance with the power information pieces received by the power information reception unit; and an instruction transmission unit operable to transmit an instruction to execute the redetermined processing to the processing device selected by the selection unit wherein each processing device includes:

an instruction reception unit operable to receive the instruction to execute the predetermined processing transmitted by the instructing device;

an execution unit operable to execute the predetermined processing if the instruction reception unit has received the instruction to execute the predetermined processing; and a power information transmission unit operable to transmit the power information piece that relates to power supply to the own processing device, wherein the power information transmission unit of each processing device includes:

a storage subunit storing therein the power information piece relating to the own processing device;

a detection subunit operable to detect a change in a state of power supply to the own processing device; and an update subunit operable to, each time the detection subunit detects a change in the state of power supply, update the power information piece stored in the storage subunit so that a result of the detection is reflected in the power information piece, wherein if the update unit has updated the power information piece, the power information transmission unit transmits the updated power information piece, wherein each processing device further includes a clock unit operable to measure a time during which the own processing device is operating and store therein the measured time, wherein each power information piece includes an average operation time of the own processing device with respect to a predetermined duration, wherein the detection subunit of the power information transmission unit detects a start of power supply to the own processing device, wherein each time the detection subunit performs the detection, the update subunit of the power information transmission unit updates the average operation time so that the time stored by the clock unit is reflected in the average operation time, and wherein the selection unit of the instructing device selects the processing device to be instructed to execute the predetermined processing, in accordance with the average operation times received by the power information reception unit of the instructing device.

7. An information processing system comprising:

an instructing device that instructs execution of predetermined processing; and a plurality of processing devices that are able to execute the predetermined processing, wherein the instructing device includes:

a power information reception unit operable to receive a plurality of power information pieces that are in one-to-one correspondence with the plurality of processing devices, each power information piece relating to power supply of the corresponding processing device and being stored by the corresponding processing device;

a selection unit operable to select, from among the processing devices, a processing device to be instructed to execute the predetermined processing, in accordance with the power information pieces received by the power information reception unit; and an instruction transmission unit operable to transmit an instruction to execute the redetermined processing to the processing device selected by the selection unit, wherein each processing device includes:

an instruction reception unit operable to receive the instruction to execute the predetermined processing transmitted by the instructing device;

an execution unit operable to execute the predetermined processing if the instruction reception unit has received the instruction to execute the predetermined processing; and a power information transmission unit operable to transmit the power information piece that relates to power supply to the own processing device, wherein the power information transmission unit of each processing device includes:

a storage subunit storing therein the power information piece relating to the own processing device;

a detection subunit operable to detect a change in a state of power supply to the own processing device; and an update subunit operable to, each time the detection subunit detects a change in the state of power supply, update the power information piece stored in the storage subunit so that a result of the detection is reflected in the power information piece, wherein if the update unit has updated the power information piece, the power information transmission unit transmits the updated power information piece, wherein each processing device further includes a clock unit operable to measure an operating time of the own processing device in each of predetermined time periods and store therein the measured operating times, wherein each power information piece includes an operation history of the own processing device pertaining to the predetermined time periods, wherein the detection subunit of the power information transmission unit detects a start of power supply to the own processing device, wherein each time the detection subunit performs the detection, the update subunit of the power information transmission unit updates the operation history so that the operating times of the own processing device in the predetermined time periods stored by the clock unit are reflected in the operation history, and wherein the selection unit of the instructing device selects the processing device to be instructed to execute the predetermined processing, in accordance with the operation histories received by the power information reception unit of the instructing device.

8. An information processing system comprising:

an instructing device that instructs execution of predetermined processing; and a plurality of processing devices that are able to execute the predetermined processing, wherein the instructing device includes:

a power information reception unit operable to receive a plurality of power information pieces that are in one-to-one correspondence with the plurality of processing devices, each power information piece relating to power supply of the corresponding processing device and being stored by the corresponding processing device;

a selection unit operable to select, from among the processing devices, a processing device to be instructed to execute the predetermined processing, in accordance with the power information pieces received by the power information reception unit; and an instruction transmission unit operable to transmit an instruction to execute the redetermined processing to the processing device selected by the selection unit, wherein each processing device includes:

an instruction reception unit operable to receive the instruction to execute the predetermined processing transmitted by the instructing device;

an execution unit operable to execute the predetermined processing if the instruction reception unit has received the instruction to execute the predetermined processing; and a power information transmission unit operable to transmit the power information piece that relates to power supply to the own processing device, wherein the power information transmission unit of each processing device includes a storage subunit storing therein the power information piece relating to the own processing device, wherein each power information piece includes a cut-ability information piece that is preset information for identifying whether a user can perform an operation to cut off power supply from an alternating current power supply to the own processing device, and wherein the selection unit of the instructing device selects the processing device to be instructed to execute the predetermined processing, in accordance with the cut-ability information pieces received by the power information reception unit of the instructing device.

9. An information processing system comprising:

an instructing device that instructs execution of predetermined processing; and a plurality of processing devices that are able to execute the predetermined processing, wherein the instructing device includes:

a power information reception unit operable to receive a plurality of power information pieces that are in one-to-one correspondence with the plurality of processing devices, each power information piece relating to power supply of the corresponding processing device and being stored by the corresponding processing device;

a selection unit operable to select, from among the processing devices, a processing device to be instructed to execute the predetermined processing, in accordance with the power information pieces received by the power information reception unit; and an instruction transmission unit operable to transmit an instruction to execute the predetermined processing to the processing device selected by the selection unit, wherein each processing device includes:

an instruction reception unit operable to receive the instruction to execute the predetermined processing transmitted by the instructing device;

an execution unit operable to execute the predetermined processing if the instruction reception unit has received the instruction to execute the predetermined processing; and a power information transmission unit operable to transmit the power information piece that relates to power supply to the own processing device, wherein the power information transmission unit of each processing device includes a storage subunit storing therein the power information piece relating to the own processing device, wherein each power information piece includes an estimated value information piece that is preset information indicating an estimated value of a probability that a user has performed an operation to cut off power supply from an alternating current power supply to the own processing device, and wherein the selection unit of the instructing device selects the processing device to be instructed to execute the predetermined processing, in accordance with the estimated value information pieces received by the power information reception unit of the instructing device.

10. An information processing system comprising:

an instructing device that instructs execution of predetermined processing; and a plurality of processing devices that are able to execute the predetermined processing, wherein the instructing device includes:

a power information reception unit operable to receive a plurality of power information pieces that are in one-to-one correspondence with the plurality of processing devices, each power information piece relating to power supply of the corresponding processing device and being stored by the corresponding processing device;

a selection unit operable to select, from among the processing devices, a processing device to be instructed to execute the predetermined processing, in accordance with the power information pieces received by the power information reception unit; and an instruction transmission unit operable to transmit an instruction to execute the redetermined processing to the processing device selected by the selection unit, wherein each processing device includes:

an instruction reception unit operable to receive the instruction to execute the predetermined processing transmitted by the instructing device;

an execution unit operable to execute the predetermined processing if the instruction reception unit has received the instruction to execute the predetermined processing; and a power information transmission unit operable to transmit the power information piece that relates to power supply to the own processing device, wherein the power information transmission unit of each processing device includes a storage subunit storing therein the power information piece relating to the own processing device, wherein each power information piece includes a battery presence information piece that is preset information for identifying whether the own processing device includes an internal battery, and wherein the selection unit of the instructing device selects the processing device to be instructed to execute the predetermined processing, in accordance with the battery presence information pieces received by the power information reception unit of the instructing device.

11. An information processing system comprising:

an instructing device that instructs execution of predetermined processing; and a plurality of processing devices that are able to execute the predetermined processing, wherein the instructing device includes:

a power information reception unit operable to receive a plurality of power information pieces that are in one-to-one correspondence with the plurality of processing devices, each power information piece relating to power supply of the corresponding processing device and being stored by the corresponding processing device;

a selection unit operable to select, from among the processing devices, a processing device to be instructed to execute the predetermined processing, in accordance with the power information pieces received by the power information reception unit; and an instruction transmission unit operable to transmit an instruction to execute the redetermined processing to the processing device selected by the selection unit, wherein each processing device includes:

an instruction reception unit operable to receive the instruction to execute the predetermined processing transmitted by the instructing device;

an execution unit operable to execute the predetermined processing if the instruction reception unit has received the instruction to execute the predetermined processing; and a power information transmission unit operable to transmit the power information piece that relates to power supply to the own processing device, wherein each processing device further includes an internal battery, wherein the power information transmission unit of each processing device includes a storage subunit storing therein the power information piece relating to the own processing device, wherein each power information piece includes a maximum operating time that is preset information indicating a maximum battery-based operating time of the own processing device, and wherein the selection unit of the instructing device selects the processing device to be instructed to execute the predetermined processing, in accordance with the maximum operating times received by the power information reception unit of the instructing device.

12. An information processing system comprising:

an instructing device that instructs execution of predetermined processing; and a plurality of processing devices that are able to execute the predetermined processing, wherein the instructing device includes:

a power information reception unit operable to receive a plurality of power information pieces that are in one-to-one correspondence with the plurality of processing devices, each power information piece relating to power supply of the corresponding processing device and being stored by the corresponding processing device;

a selection unit operable to select, from among the processing devices, a processing device to be instructed to execute the predetermined processing, in accordance with the power information pieces received by the power information reception unit; and an instruction transmission unit operable to transmit an instruction to execute the redetermined processing to the processing device selected by the selection unit, wherein each processing device includes:

an instruction reception unit operable to receive the instruction to execute the predetermined processing transmitted by the instructing device;

an execution unit operable to execute the predetermined processing if the instruction reception unit has received the instruction to execute the predetermined processing; and a power information transmission unit operable to transmit the power information piece that relates to power supply to the own processing device, wherein the information processing system further comprises a power information server, wherein the instructing device further includes a request information transmission unit operable to transmit, to the power information server, request information that requests transmission of the power information pieces, and wherein the power information server includes:

a server power information reception unit operable to receive the power information pieces transmitted by the power information transmission units of the processing devices;

a request information reception unit operable to receive the request information transmitted by the instructing device; and a server power information transmission unit operable to, if the request information reception unit has received the request information, transmit the power information pieces received by the server power information reception unit to the instructing device that transmitted the request information.

* * * * *

UNITED STATES PATENT AND TRADEMARK OFFICE
CERTIFICATE OF CORRECTION

PATENT NO. : 8,161,300 B2
APPLICATION NO. : 12/307955
DATED : April 17, 2012
INVENTOR(S) : Takenobu Tani It is certified that error appears in the above-identified patent and that said Letters Patent is hereby corrected as shown below:

ON THE COVER PAGE and COLUMN 1, LINE 1, Title

"INSTRUCTING DEVICE CONFIGURED TO SELECTS A COOPERATING DEVICE BASED ON A PREDETERMINED POWER SUPPLY RELIABILITY" should read
--INSTRUCTING DEVICE CONFIGURED TO SELECT A COOPERATING DEVICE BASED ON A PREDETERMINED POWER SUPPLY RELIABILITY--.

Signed and Sealed this
Twenty-second Day of January, 2013

David J. Kappos
*Director of the United States Patent and Trademark Office*